(12) United States Patent
Oochi

(10) Patent No.: US 8,307,757 B2
(45) Date of Patent: Nov. 13, 2012

(54) KNEADING ELEMENT OF KNEADER, KNEADER, AND BREAD MACHINE

(75) Inventor: Syuzo Oochi, Tokyo (JP)

(73) Assignee: Japan Kneader Co., Ltd., Tokyo (JP)

( * ) Notice: Subject to any disclaimer, the term of this patent is extended or adjusted under 35 U.S.C. 154(b) by 502 days.

(21) Appl. No.: 12/594,999

(22) PCT Filed: Apr. 9, 2008

(86) PCT No.: PCT/JP2008/057378
§ 371 (c)(1),
(2), (4) Date: Feb. 26, 2010

(87) PCT Pub. No.: WO2008/126934
PCT Pub. Date: Oct. 23, 2008

(65) Prior Publication Data
US 2010/0147160 A1    Jun. 17, 2010

(30) Foreign Application Priority Data

Apr. 10, 2007    (JP) .................................. 2007-102758
Aug. 20, 2007    (JP) .................................. 2007-214167

(51) Int. Cl.
*A47J 27/00* (2006.01)
*A21C 1/10* (2006.01)
(52) U.S. Cl. ................. 99/348; 99/353; 366/98
(58) Field of Classification Search ............ 99/324, 99/348, 352, 353, 357, 389, 383, 367, 410, 99/415, 467; 81/3.55, 3.57; 366/96–98, 366/314
See application file for complete search history.

(56) References Cited

U.S. PATENT DOCUMENTS

| 4,202,258 | A | * | 5/1980 | Masuda et al. .................. 99/348 |
| 4,957,040 | A | * | 9/1990 | Nakakura et al. ............... 99/348 |
| 5,839,358 | A | * | 11/1998 | Malecki .......................... 99/348 |
| 6,029,563 | A | * | 2/2000 | Nakagawa et al. ............. 99/327 |
| 6,321,641 | B1 | * | 11/2001 | Wang ............................... 99/348 |
| 7,275,479 | B2 | * | 10/2007 | Park et al. ....................... 99/348 |

FOREIGN PATENT DOCUMENTS

| JP | 61-126928 | 6/1987 |
| JP | 62-126928 | 6/1987 |
| JP | H5-38828 | 9/1993 |
| JP | 5-78375 | 10/1993 |
| JP | 2000-93318 | 4/2000 |
| WO | 03/073860 | 9/2003 |

* cited by examiner

*Primary Examiner* — Kien Nguyen
(74) *Attorney, Agent, or Firm* — Whitham Curtis Christofferson & Cook, PC

(57) ABSTRACT

A kneading element is rotary driven around a rotating shaft disposed in a bottom part in a pot to knead ingredients within the pot. The kneading element has a blade part that has a bottom surface circumferential edge that is substantially semi-elliptical, wherein an inclined surface is formed in a side surface of the blade part, an erection surface is formed in a rotation direction back surface of the blade part, and the inclined surface is formed such that ingredients to be kneaded are rotated on the inclined surface. According to this configuration, because dough materials within the pot can be scooped up and rotated on the kneading element and furthermore flipped and tossed toward the inner circumferential surface of the pot, great pressure can be applied directly from the entire area of the inner circumferential surface of the pot to the dough material pressurized by the kneading element, whereby the entire area of the inner circumferential surface of the pot can be effectively used to knead the ingredients effectively.

15 Claims, 26 Drawing Sheets

(a)

(b)

(c)

(a)

(b)

(c)

(a)            (b)

KNEADING ELEMENT OF KNEADER, KNEADER, AND BREAD MACHINE

TECHNICAL FIELD

The present invention relates to a kneading element of a kneader, which is suitable for mixing and kneading and then tamping down a dough material, such as a bread dough, a noodle dough such as wheat and buckwheat noodle, a confectionary dough, or a rice cake. The present invention also relates to a kneader having this kneading element, and a bread machine.

BACKGROUND ART

Kneaded products, such as a bread dough, a noodle dough such as wheat and buckwheat noodle, a confectionary dough, and a rice cake, are made by the steps of mixing, kneading and pounding predetermined ingredients into cakes.

In the case of making a bread dough with a direct kneading process, the steps described above contain repeated operations of first mixing ingredients such as flour, water, yeast, sugar, salt and shortening, and thereafter kneading and folding the obtained mixed ingredient. By appropriately and adequately carrying out these steps, hydration, that is, formation and binding of gluten, is promoted.

However, it takes considerable effort and is actually difficult to perform hand-kneading in these steps, that is, to perform these steps with hands. Therefore, in recent years, in not only households but also bread plants for mass-producing, these steps are carried out using a kneader utilizing not a human hand but a electric and mechanical power.

A kneader is a device for producing kneaded products, and has a kneading element disposed rotatably within a pot of the kneader. The kneading element is rotated by drive means about rotating shaft extending in an orthogonal direction of a bottom surface of the pot, whereby ingredients thrown into the pot can be mixed and kneaded.

Such kneaders or kneading elements used in the kneaders have been proposed in the past.

For example, an inventor of the present application has proposed a kneading element that is capable of promoting gluten binding in a kneading step by repeating the action similar to the "kneading" performed in hand-kneading (see Patent Literatures 1 and 2, for example).

The kneading elements of the kneaders described in Patent Literatures 1 and 2 each have a disk having a diameter slightly smaller than that of the bottom surface within the pot. A predetermined position on this disk is provided with parabolically radiating projected parts that extend from a predetermined height at a central part of the disk to a circumferential edge of the disk. The rear end face of each projected part in the rotating direction forms a bluffy erection surface. The section in front of the erection surface in the rotation direction in the kneading element forms a parabolic surface or a circular surface having an angle of 90° or lower with respect to the erection surface, in order to enhance the pressure-contact effect by mutually acting with the projected parts provided on the inner circumferential surface of the pot.

However, the kneading elements of the kneaders described in Patent Literatures 1 and 2 each are constituted by a discoid base having a diameter slightly smaller than that of the bottom surface inside the pot. For this reason, the problem is that ingredients and dough enter the space between the kneading element and the bottom surface within the pot and that these dough and the like cannot be removed.

Furthermore, the dough is rolled by centrifugal force generated by the rotation of the disk, and rolling friction, which increases as the hydration of the dough develops. Therefore, when the rolling friction surpasses the centrifugal force, the dough adheres to the disk and rotates integrally with the disk, and as a result, good kneading cannot be performed. Hence, another problem is that, when using this kneader, the diameter of the dough mass has to be equal to or less than the radius of the disk of the kneading element.

The inventor of the present application, therefore, has proposed a small and light kneading element that is capable of preventing the entry of a dough or the like into a space between a bottom surface within a pot and the kneading element as much as possible, and to immediately remove the dough even when the dough enters into the space (see Patent Literature 3, for example). In this kneading element, the diameter of the dough mass can be set at the length greater than the length of the blade of the kneading element or the radius of the bottom surface within the pot.

FIG. 20 is a diagram showing an embodiment of the kneading element described in Patent Literature 3, wherein (a) is a plan view and (b) a cross-sectional diagram taken along a line A-A in (a).

The kneading element described in Patent Literature 3 has a shaft center of the rotating shaft, and a pair of long and short semi-elliptical blades, one of the blades being longer than the other, with the line passing through the rotating shaft in a diameter direction between the blades. These blades are formed by bringing straight lines thereof into contact with each other, and one side of each blade from the shaft center of the rotating shaft (the front side in the rotation direction) is shorter than the other side (the rear side in the rotation direction). One side of one of the blades is the same length as the other side of the other blade, and circumferential edges of bottom parts of the blades are connected by the same arc. Moreover, as shown in FIG. 20(b), on each of the blades, a side surface part extending from the circumferential edge of the bottom part to the top surface of the blade forms a parabolic inclined surface that becomes steep gradually from the abovementioned one side to the other, and a deep bluffy erection surface is formed on a rotation direction back face (rear end part) of the other side of the abovementioned one of the blades. In addition, one side end of the abovementioned other blade is connected to a bottom part of the erection surface of the abovementioned one of the blades, and a shallow bluffy erection surface is formed on the rotation direction back surface (rear end part) of the other side.

According to this kneading element, the inclined surface of one of the blades mixes and kneads ingredients or a dough mass by moving and lifting up the ingredients or dough mass dropping the ingredients or dough mass in a deep bluffy erection surface area. Moreover, in this kneading element, even when the dough enters and adheres to the space between the element and the bottom surface within the pot, the entering dough is scraped out in a pot inner circumferential surface direction by the circumferential edge of the bottom part extending from one side of the blades to the other side of the blades. The remaining entering dough that was not scraped out is removed immediately by bonding with the dough mass that falls off the erection surface of the abovementioned one of the blades, as the kneading element rotates.

In a back surface area (rear side area) of the bluffy erection surface of the kneading element, because a layer of decompressed air is generated between the dough mass and the kneading element when kneading is performed, a force for rotating the dough more powerfully acts in the back surface area due to the decompressed air, and at the same time an action for preventing the dough from adhering to the bottom surface of the pot or kneading element is generated. Thus, even when kneading a large dough mass having a diameter equal to or greater than a radius of the bottom part of the pot, the dough is prevented from adhering to the kneading element, and therefore the dough does not rotate integrally with the kneading element. As a result, a phenomenon where kneading is not performed can be prevented.

However, as with the kneading elements described in Patent Literatures 1 and 2, in the kneading element described in Patent Literature 3 the pressure-contact effect from side surfaces of the projected parts provided on the inner circumferential surface of the pot is anticipated. In other words, in any of the kneading elements described in Patent Literatures 1 to 3, as shown in FIG. 20 (b), the shape of a side surface of the kneading element forms a parabolic or circular steep slope, the front side of which from the bluffy erection surface in the rotation direction drops drastically. Therefore, in the kneading element, the dough mass is pressurized by the steep slope in a direction of the projected parts, that is, in a direction substantially orthogonal to the bluffy erection surface.

When the dough mass is pressurized by the kneading element in an area without the projected parts, the pressure that the dough mass receives from the inner circumferential surface of the pot is not very large. Moreover, the presence of the projected parts in the inner circumferential surface of the pot makes it difficult to clean the inside of the pot after using the kneader.

For this reason, if possible, it is desired that the projected parts of the inner circumferential surface of the pot be eliminated so that the dough mass pressurized by the kneading element can receive great pressure directly from the inner circumferential surface of the pot in the entire area of the inner circumferential surface of the pot. In other words, it is desired that the kneading element be so shaped that the dough mass is pressurized directly toward the inside surface of the pot.

Note that another kneading element that reduces the adhesion of a dough to the kneading element and performs kneading by continuously compressing the dough is proposed (see Patent Literature 4, for example).

The kneading element described in Patent Literature 4 is formed such that when a side surface thereof is taken as a cross section in a surface including a rotation central shaft, the distance between one point on the side surface and the rotation central shaft decreases from a bottom part to the top surface or is constant. Further, this kneading element is formed such that when the side surface thereof is taken as a cross section in a surface orthogonal to the rotation central shaft, the distance between one point on the side surface and the rotation central shaft always increases in one rotation.

However, in the kneading element described in Patent Literature 4, because the side surface extending from the bottom part to the top surface is formed into a bluffy surface throughout the entire circumference of the bottom part, the kneading effect of scooping up a dough material is not very significant.

In addition, in the ideal kneading to be performed as soon as a dough mass is obtained, it is preferred that a circumferential edge part of the kneading element be embedded into a bottom part of the dough mass in a wedge shape, and that the dough mass be then placed on the side surface of the kneading element, moved while rotating the dough mass and then dropped into the area of a bluffy erection surface in a rotation direction rear end part of the kneading element. This is because the "kneading" and "folding" effect of so-called "hand-kneading" performed on the dough mass can be improved by this series of flows. However, in the kneading element described in Patent Literature 4, because the side surface extending from the bottom part to the top surface is formed into a bluffy surface throughout the entire circumference of the bottom part, this "hand-kneading" effect obtained in the series of flows described above is not very significant.

[Patent Literature 1] Japanese Unexamined Patent Application Publication No. S62-126928

[Patent Literature 2] Japanese Examined Patent Application Publication No. H5-78375

[Patent Literature 3] Japanese Examined Utility Model Application Publication No. H5-38828

[Patent Literature 4] International Publication WO2003/073860

DISCLOSURE OF THE INVENTION

Problem to be Solved by the Invention

The present invention was contrived in order to solve the problems of the conventional technologies described above, and an object of the present invention is to provide a kneading element of a kneader, in which a dough material is kneaded extremely efficiently and a pressurized dough mass can receive great pressure directly from the entire area of an inner circumferential surface of a pot, a kneader that uses this kneading element, as well as a bread machine.

Means for Solving Problem

A kneading element of a kneader according to the present invention is characterized by comprising a kneading element that is rotary driven around a rotating shaft disposed in a bottom part in a pot, to knead ingredients within the pot, the kneading element having: a blade part that has a bottom surface circumferential edge that is substantially semi-elliptical, wherein an inclined surface is formed in a side surface of the blade part, an erection surface is formed in a rotation direction back surface of the blade part, and the inclined surface is formed such that ingredients to be kneaded are rotated on the inclined surface.

In the kneading element of a kneader according to the present invention, it is characterized that when the kneading element is sectioned along a plain surface that is "orthogonal to the bottom surface of the blade part" and "includes the rotating shaft," the cross section of the inclined surface in a partial area from a rotation direction front side of the blade part to a rotation direction rear side of the same is in the shape of a curve bending on the bottom surface side of the blade part, and a curvature of the curve gradually decreases from the rotation direction front side to the rotation direction rear side.

In the kneading element of a kneader according to the present invention, it is characterized that the cross section of the inclined surface at a rotation direction rear end of the blade part is in the shape of a straight line or a curve bending on a side opposite to the bottom surface of the blade part.

In the kneading element of a kneader according to the present invention, it is characterized that a projected part is provided on a surface of the inclined surface.

The kneading element of a kneader according to the present invention is characterized by comprising a kneading element that is rotary driven around a rotating shaft disposed in a bottom part in a pot, to knead ingredients within the pot, the kneading element having: a first blade part and a second blade part, wherein the first blade part and the second part are formed like being bonded with each other, the first blade part and the second part have bottom surface circumferential edges that are substantially semi-elliptical respectively, the length of a bottom surface straight line part of the first blade part is shorter than the length of a bottom surface straight line part of the second blade part, the first blade part and the second blade part are in contact with each other such that the bottom surface straight line parts of the first blade part and the second blade part hold, therebetween, a shaft center of the rotating shaft and a straight line passing through the shaft line, and such that a "rotation direction rear end of a bottom surface curve part of the first blade part" and a "rotation direction front end of a bottom surface curve part of the second blade part" are connected together in abutment to form a circular arc, a first inclined surface is formed in a side surface of the first blade part, a second inclined surface is formed in a side surface of the second blade part, an erection surface connected to a rotation direction front end of the first inclined surface is formed in a rotation direction back surface of the second blade part, and the second inclined surface is formed such that ingredients to be kneaded are rotated on the second inclined surface.

In the kneading element of a kneader according to the present invention, it is characterized that when the kneading element is sectioned along a plain surface that is "orthogonal to a bottom surface of the second blade part" and "includes the rotating shaft," the cross section of the second inclined surface in a partial area from a rotation direction front side of the second blade part to a rotation direction rear side of the same is in the shape of a curve bending on the bottom surface side of the second blade part, and a curvature of the curve gradually decreases from the rotation direction front side to the rotation direction rear side.

In the kneading element of a kneader according to the present invention, it is characterized that the cross section of the second inclined surface at the rotation direction rear end of the second blade part is in the shape of a straight line or a curve bending on a side opposite to the bottom surface of the second blade part.

In the kneading element of a kneader according to the present invention, it is characterized that a projected part is provided on a surface of the second inclined surface.

In the kneading element of a kneader according to the present invention, it is characterized that when the kneading element is sectioned along a plain surface that is "orthogonal to a bottom surface of the first blade part" and "includes the rotating shaft," the cross section of the first inclined surface in a partial area from a rotation direction front side of the first blade part to a rotation direction rear side of the same is in the shape of a curve bending on the bottom surface side of the first blade part, and a curvature of the curve gradually decreases from the rotation direction front side to the rotation direction rear side.

In the kneading element of a kneader according to the present invention, it is characterized that the cross section of the first inclined surface at the rotation direction rear end of the first blade part is in the shape of a straight line or a curve bending on a side opposite to the bottom surface of the first blade part.

In the kneading element of a kneader according to the present invention, it is characterized that a projected part is provided on a surface of the first inclined surface.

A kneader according to the present invention is characterized by comprising a kneader that has a pot, a kneading element for kneading ingredients within the pot, and drive means for rotary driving the kneading element in a bottom part within the pot, wherein the kneading element is the above-mentioned kneading element of the kneader according to the present invention.

A bread machine according to the present invention is characterized by being a bread machine that can be installed with a kneading pot used for kneading ingredients for bread, and a baking pot used for baking kneaded dough mass of bread, wherein a kneading element attached in the kneading pot and kneading the ingredients for bread is the abovementioned kneading element of a kneader according to the present invention.

The bread machine according to the present invention is characterized by being configured such that the kneading pot and the baking pot are interchangeable.

The bread machine according to the present invention is characterized by being configured such that the kneading pot and the baking pot can be provided side-by-side.

Effect of the Invention

According to the present invention, because the dough material within the pot can be scooped up and rotated on the kneading element and further flipped and tossed toward the inner circumferential surface of the pot, great pressure can be applied directly from the entire area of the inner circumferential surface of the pot to the dough material pressurized by the kneading element, whereby the entire area of the inner circumferential surface of the pot can be effectively used to knead the ingredients effectively.

Further, according to the present invention, because the dough can be kneaded without cutting it, gluten formed by kneading the dough and having an appropriately balanced combination of glutinosity and elasticity is inseparable. Since there is no friction caused by cutting the dough, no heat is generated locally on the dough, and thereby the dough is not adversely affected.

Moreover, according to the present invention, due to the action of the space between the erection surface provided in the kneading element and the bottom surface of the pot, even when the dough mass has a large diameter, adhesion of the dough to the kneading element is significantly alleviated. Because the dough is folded by this space, better kneading can be performed

EXPLANATION OF REFERENCE NUMERALS

Figure 1:
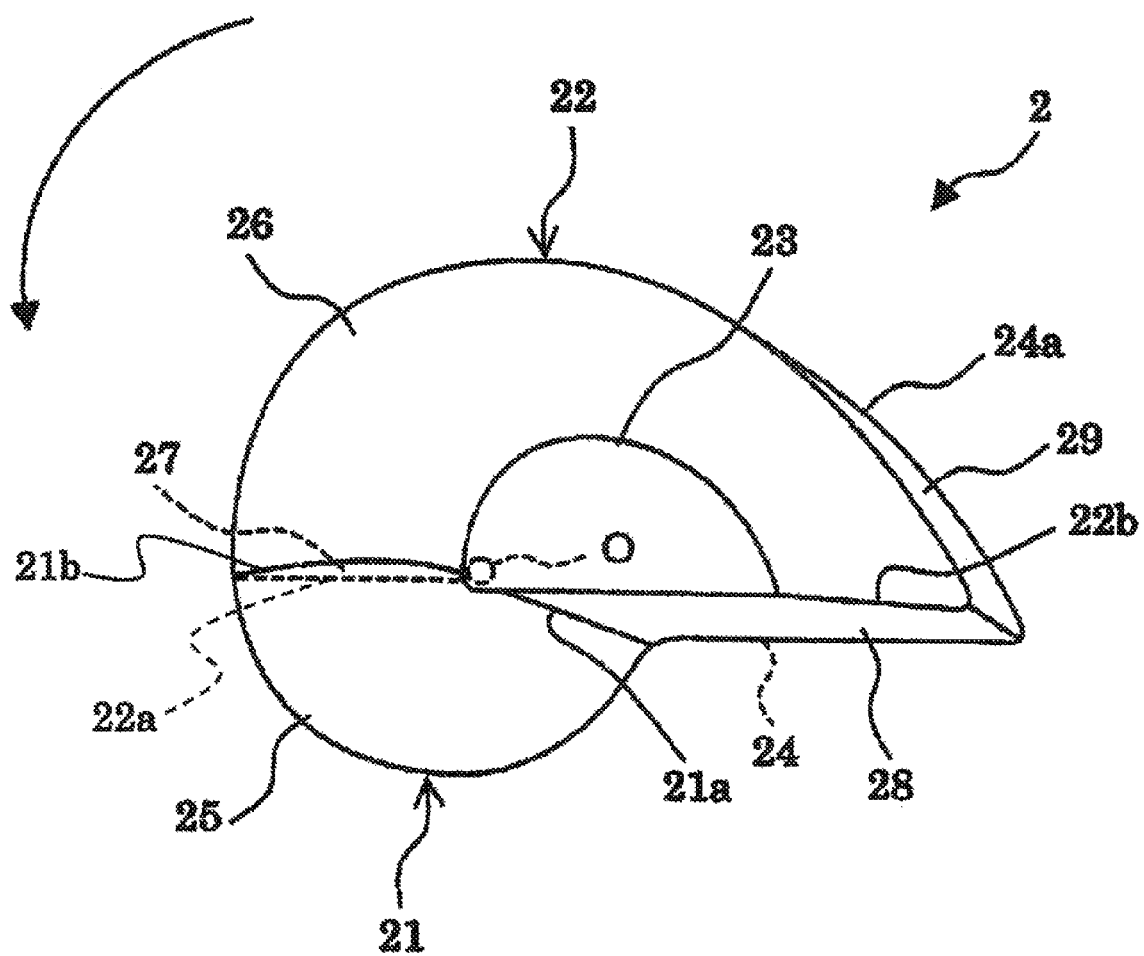
FIG. 1 is a perspective view showing an embodiment of a kneading element of a kneader according to the present invention.

1 Kneader main body
2 Kneading element
3 Pot
10 Kneader
20 Continuous part
21 First blade part
22 Second blade part
23 Top surface
24 Bottom surface
25 First inclined surface
26 Second inclined surface
27 First erection surface
28 Second erection surface
29 Third erection surface
100 Bread machine
210 Kneading pot
220 Baking pot
300 Kneading element

BEST MODE FOR CARRYING OUT THE INVENTION

Embodiments of the kneading element of a kneader and of the kneader according to the present invention will be described hereinafter in detail with reference to the drawings.

First, the embodiments of the kneading element of a kneader according to the present invention (to be simply referred to as "kneading element" hereinafter) will be described.

The kneading element, which is disposed rotatably within a pot of a kneader for producing a kneaded product, is rotary driven in a rotating shaft direction orthogonal to a bottom surface of a pot and kneads ingredients within the pot.

Note the following describes the kneading element as if two blade parts are created individually and bonded with each other to create the kneading element. However, when actually creating the kneading element, the two blade parts may be created integrally by cutting or pressing an aluminum block, or by using other creation method. Further, at the end, a surface of the kneading element may be subjected to Teflon™ processing. Alternatively, polypropylene may be subjected to metallic molding to create the kneading element.

Moreover, "length" described hereinafter means the distance of an orthogonal direction to a rotating shaft direction and "height" means the distance in the rotating shaft direction.

FIG. 1 is a perspective view showing an embodiment of the kneading element according to the present invention. The illustrated arrow represents a rotation direction of a kneading element 2. Reference numeral O represents a shaft center of a rotating shaft.

Figure 4:
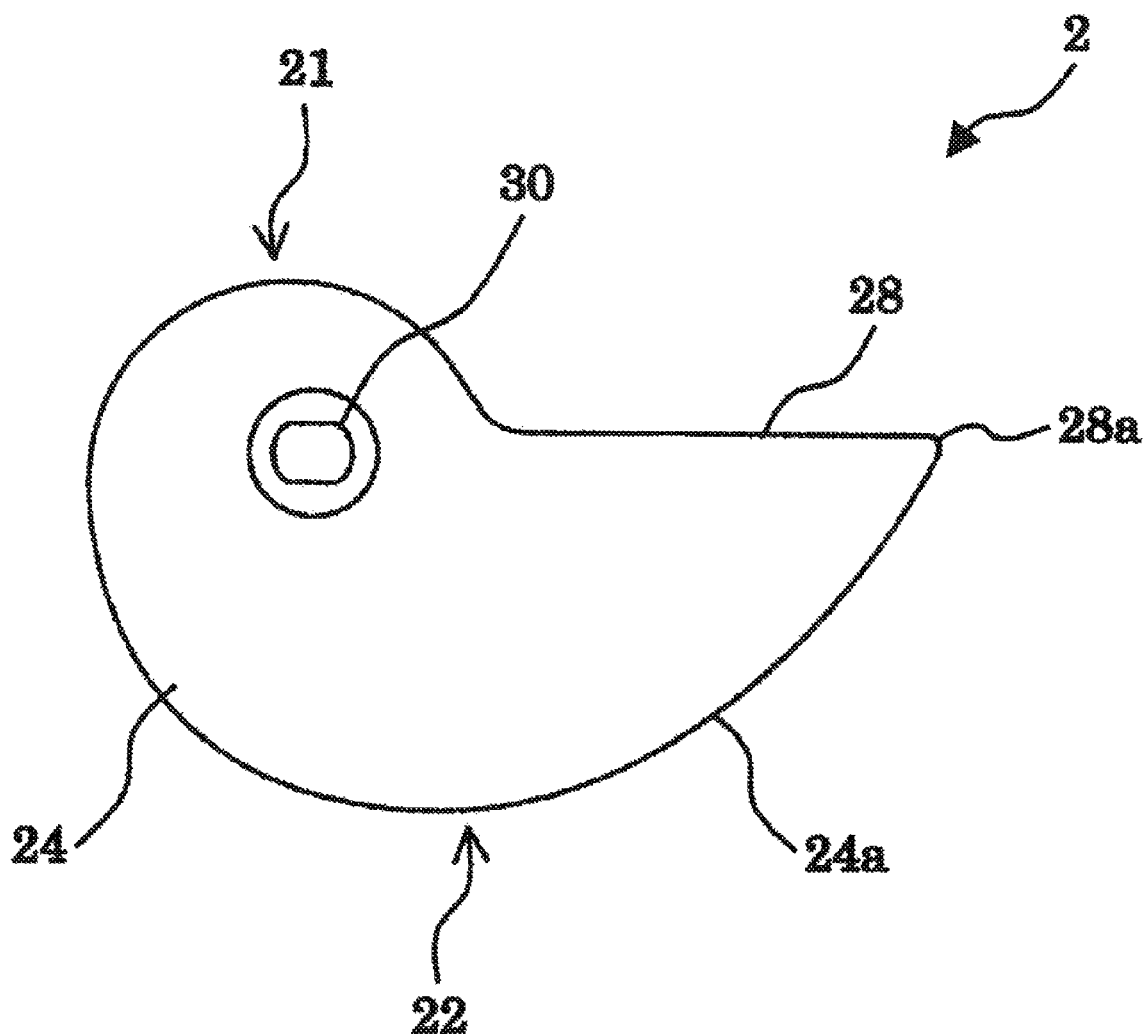
FIG. 4 is a bottom plan view of the kneading element.

FIG. 4 is a bottom plan view of the kneading element 2. In a bottom surface 24 of the kneading element 2, a shaft hole 30 capable of being coupled to a rotary driving shaft (provided in a kneader) of drive means for rotary driving the kneading element 2 is formed.

Returning to FIG. 1, a blade part 21 and a blade part 22 are formed like being bonded with each other to form the kneading element 2.

Reference numeral 23 represents a top surface of the kneading element 2, a circumferential surface of which is connected to an upper edge of an inclined surface 26 and an upper edge of an erection surface 28. The inclined surface 26 and the erection surface 28 are described hereinafter. The top surface 23 is formed into a substantially semi-elliptical shape. The area of the top surface 23 is smaller than the area of a bottom surface of the blade part 22.

The blade part 21 is formed into a substantially semi-conical shape, wherein an inclined surface 25 is formed on a side surface of the blade part 21. The inclined surface 25 is formed in the area from the top surface 23 of the kneading element 2 throughout the bottom surface 24 to form a radial shape extending from the vicinity of the top of the blade part 21 toward a bottom surface outer edge of the blade part 21.

The inclined surface 26 is formed in a side surface of the blade part 22. The inclined surface 26 is formed in the area from the top surface 23 of the kneading element 2 throughout the bottom surface 24 to form a radial shape extending from the circumferential edge of the top surface 23 (a semi-elliptical curved part) toward a bottom surface outer edge of the blade part 22.

Figure 6:
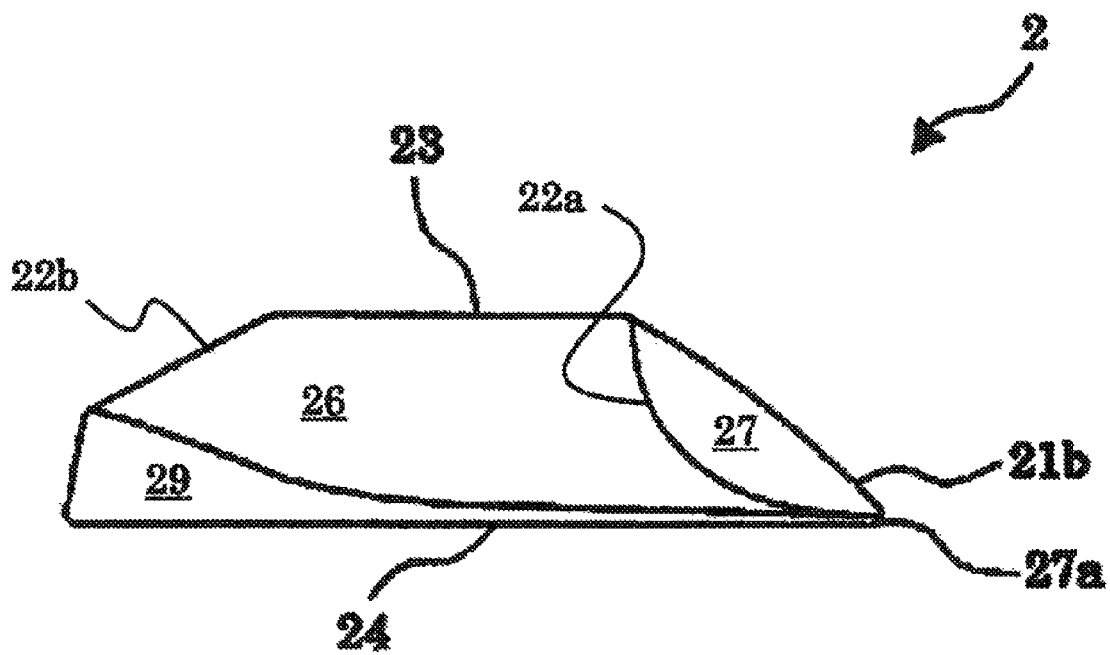
FIG. 6 is a back view of the kneading element.
Figure 8:
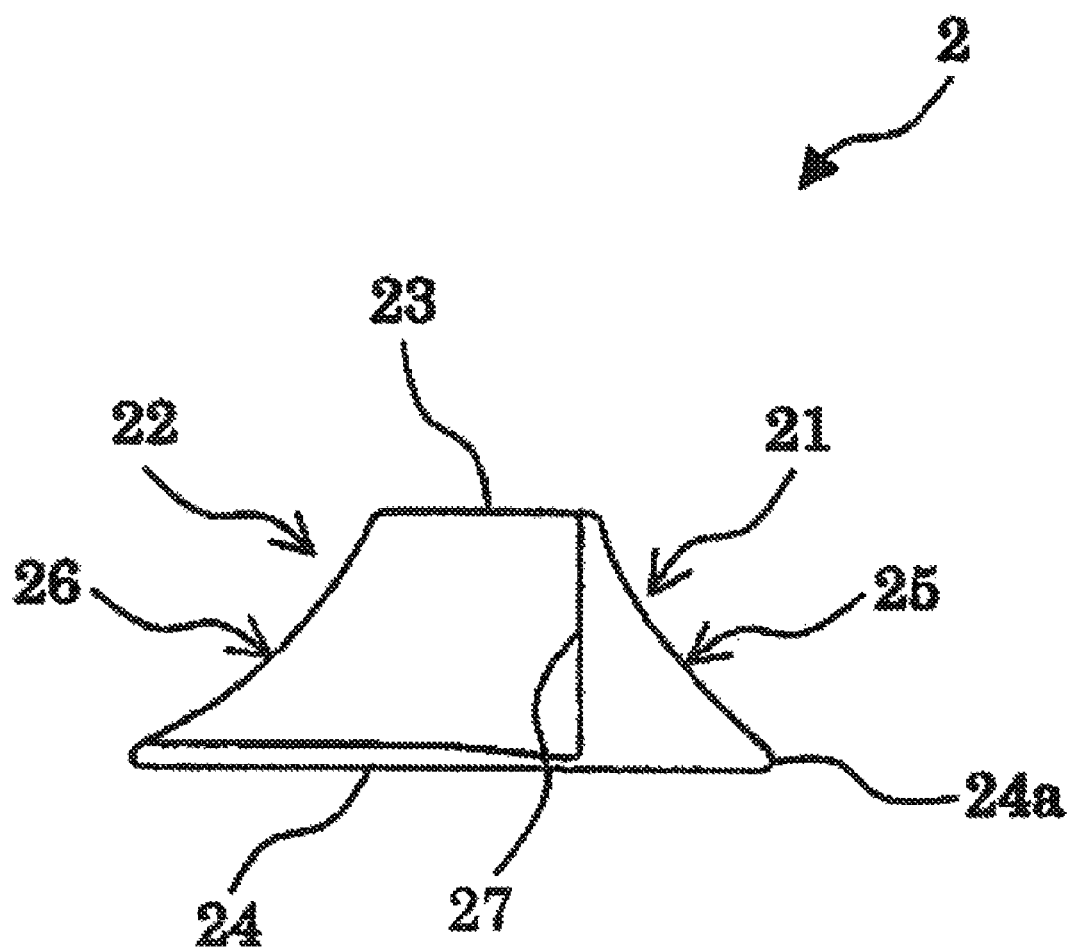
FIG. 8 is a left side view of the kneading element.

FIG. 6 is a back view of the kneading element 2, and FIG. 8 is a left side view of the kneading element 2.

As shown in FIGS. 6 and 8, an erection surface 27 is formed in a rotation direction back surface of the blade part 21, and a step is formed between a rotation direction rear end 21b of the blade part 21 and a rotation direction front end 22a of the blade part 22.

Figure 5:
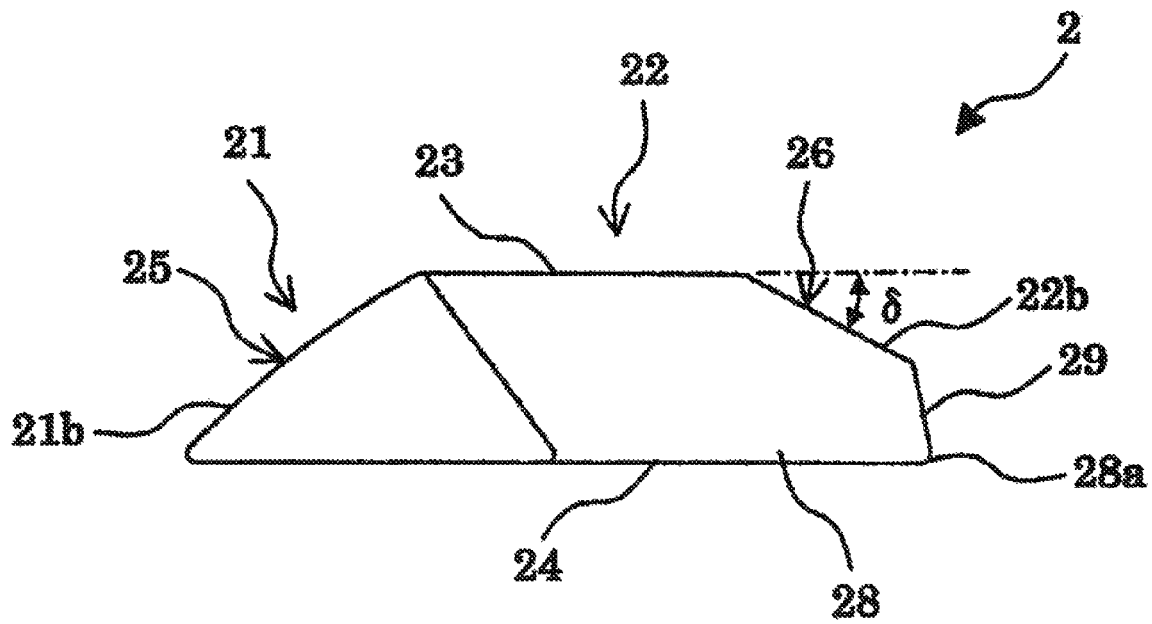
FIG. 5 is a front view of the kneading element.
Figure 7:
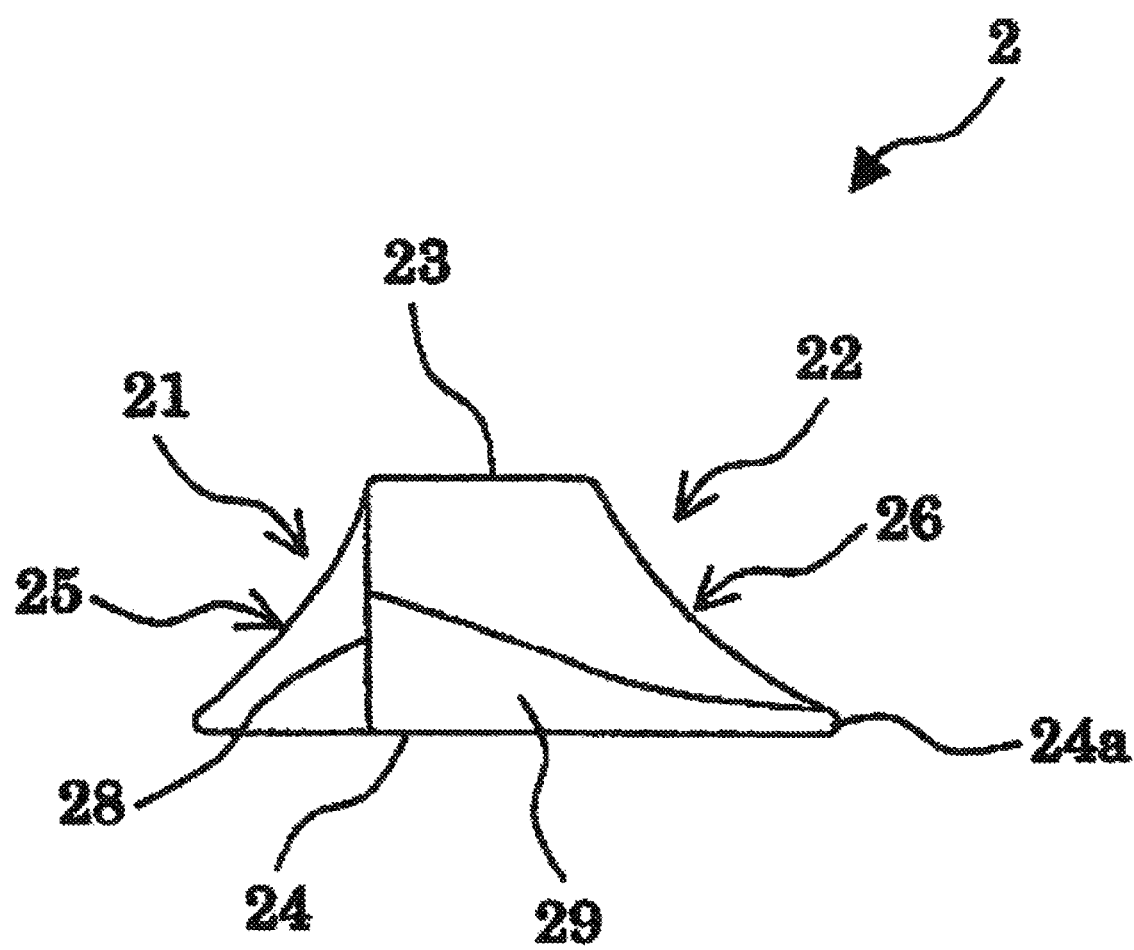
FIG. 7 is a right side view of the kneading element.

FIG. 5 is a front view of the kneading element 2, and FIG. 7 is a right side view of the kneading element 2.

As shown in FIGS. 5 and 7, the erection surface 28 is formed in a rotation direction back surface of the blade part 22, and a step is formed between a rotation direction rear end 22b of the blade part 22 and the bottom surface 24 of the kneading element 2.

As shown in FIG. 1, a rotation direction front end 21a of the inclined surface 25 is connected to the erection surface 28, and the rotation direction front end 22a of the inclined surface 26 is connected to the erection surface 27.

Further, as shown in FIGS. 6 and 7, an erection surface 29 connected to an outer edge of the erection surface 27, a lower edge of the inclined surface 26, the bottom surface 24 of the blade part 22, and an outer edge of the erection surface 28 is formed between the bottom surface 24 and the inclined surface 26 of the blade part 22. The height of the erection surface 29 gradually increases from the rotation direction front side toward the rotation direction rear side.

Note that the erection surfaces 27, 28, 29 are all provided in the form of a cliff, in a direction substantially orthogonal to the bottom surface 24 of the kneading element 2.

The shapes of the bottom surfaces of the blade part 21 and blade part 22 are described hereinafter.

Figure 2:
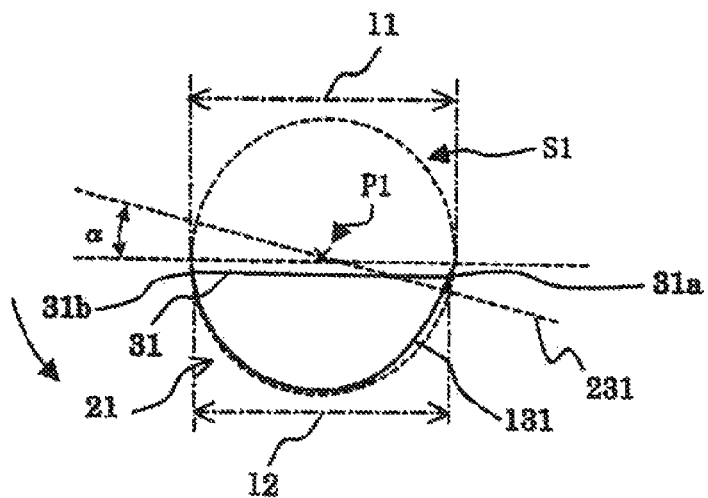
FIG. 2 is a schematic diagram for illustrating the shape of a bottom surface circumferential edge of the kneading element, wherein (a) shows the shape of a bottom surface circumferential edge of a first blade, (b) shows the shape of a bottom surface circumferential edge of a second blade, and (c) shows the shape of a bottom surface circumferential edge in which the first blade and the second blade are bonded with each other.
Figure 2:
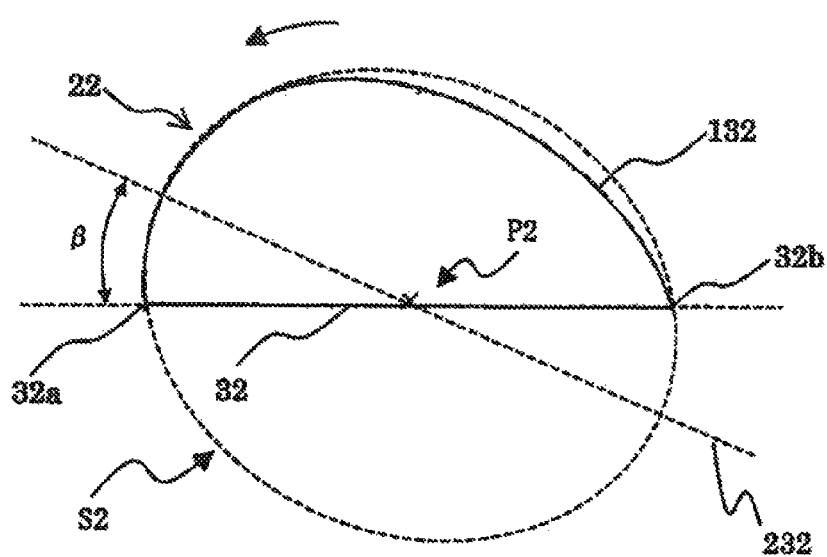
Figure 2:
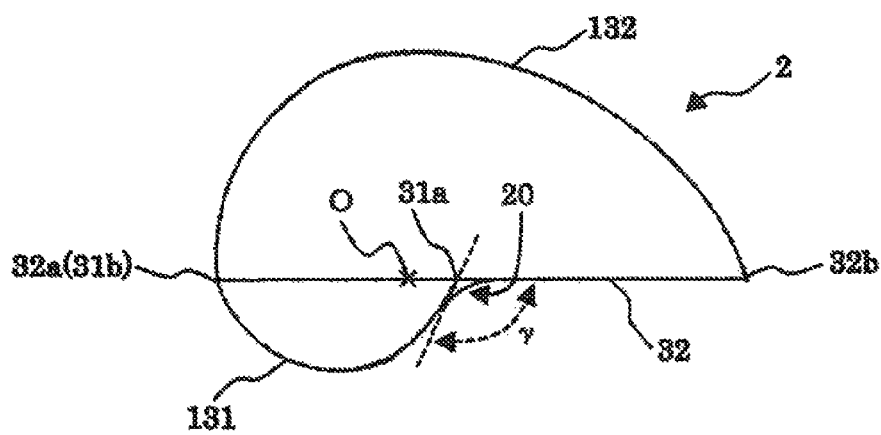

FIG. 2(a) is a diagram showing the shape of a bottom surface circumferential edge of the blade part 21. The arrow shown in the diagram represents the rotation direction of the kneading element 2.

The bottom surface circumferential edge of the blade part 21 shown by a solid line is in a substantially semi-elliptical shape surrounded by a bottom surface straight line part 31 and a bottom surface curved part 131.

Reference numeral 31a represents a rotation direction front end of the bottom surface curved part 131 (also a rotation direction front end of the bottom surface straight line part 31). Reference numeral 31b represents a rotation direction rear end of the bottom surface curved part 131 (also a rotation direction rear end of the bottom surface straight line part 31).

An ellipse S1 shown by a dashed line is an ellipse used for determining the shape of the bottom surface circumferential edge of the blade part 21. Reference numeral P1 represents the center of the ellipse S1, and reference numeral 231 a short axis of the ellipse S1.

The aspect ratio (long axis:short axis) of the ellipse S1 is 11:10.

Reference numeral α represents an inclination of the bottom surface straight line part 31 in relation to the short axis 231 of the ellipse S1 (within a rotation surface). Note that α≅15° is established in the present embodiment.

FIG. 2(b) is a diagram showing the shape of a bottom surface circumferential edge of the blade part 22. The arrow shown in the diagram represents the rotation direction of the kneading element 2.

The bottom surface circumferential edge of the blade part 22 shown by a solid line is in a substantially semi-elliptical shape surrounded by a bottom surface straight line part 32 and a bottom surface curved part 132.

Reference numeral 32a represents a rotation direction front end of the bottom surface curved part 132 (also a rotation direction front end of the bottom surface straight line part 32). Reference numeral 32b represents a rotation direction rear end of the bottom surface curved part 132 (also a rotation direction rear end of the bottom surface straight line part 32).

An ellipse S2 shown by a dashed line is an ellipse used for determining the shape of the bottom surface circumferential edge of the blade part 22. Reference numeral P2 represents the center of the ellipse S2, and reference numeral 232 a long axis of the ellipse S2.

The aspect ratio of the ellipse S2 is 17:14.

Reference numeral β represents an inclination of the bottom surface straight line part 32 in relation to the long axis 232 of the ellipse S2 (within t rotation surface). Note that β≅25° is established in the present embodiment.

The length of a long axis of the ellipse S1 is ½ of the length of the long axis of the ellipse S2. In addition, as is clear from the aspect ratios described above, the ellipse S1 is closer to a circle than as compared to the ellipse S2.

Note that the aspect ratios of the ellipse S1 and the ellipse S2 can be changed appropriately. A circle having an aspect ratio of 1:1 may be taken as a type of an ellipse.

FIG. 2(c) is a diagram showing a state of the bottom surface of each of the blade parts 21 and 22 when the blade parts are bonded with each other.

The length of the bottom surface straight line part 31 of the blade part 21 is shorter than the length of the bottom surface straight line part 32 of the blade part 22.

Further, in both of the blade parts 21 and 22, the length between the rotation direction front end (31a, 32a) of the bottom surface straight line part (31, 32) and the shaft center O of the rotating shaft is shorter than the length between the rotation direction rear end (31b, 32b) of the bottom surface straight line part (31, 32) and the shaft center O of the rotating shaft.

Moreover, the length between the rotation direction rear end 31b of the bottom surface straight line part 31 of the blade part 21 and the shaft center O of the rotating shaft is equal to the length between the rotation direction front end 32a of the bottom surface straight line part 32 of the blade part 22 and the shaft center O of the rotating shaft.

In the blade part 21 and the blade part 22, the bottom surface straight line part 31 and the bottom surface straight line part 32 are bonded in contact with each other so as to hold therebetween the shaft center O (not shown) of the rotating shaft and a straight line passing through the shaft center O. The blade part 21 and the blade part 22 are bonded with each other such that the rotation direction rear end 31b of the bottom surface curved part 131 and the rotation direction front end 32a of the bottom surface curved part 132 are connected with each other in the form of a circular arc.

As shown in FIG. 2(a), the bottom surface curved part 131 of the blade part 21 is shifted to the inside of the ellipse S1 (toward the center P1 side) on the rotation direction front side. Due to this configuration, the angle γ between the bottom surface curved part 131 and the bottom surface straight line part 32 at the rotation direction front end 31a of the bottom surface curved part 131 of the blade part 21 can be increased, as shown in FIG. 2(c).

Increasing this angle γ can enhance the effect of preventing the ingredients from accumulating in the area surrounded by the bottom surface curved part 131 and the bottom surface straight line part 32 when rotating the kneading element 2 in the pot.

Note that, as shown in FIG. 2(c), a circular arc connection part 20 may be provided in the area surrounded by the bottom surface curved part 131 and the bottom surface straight line part 32, to bond a bottom part of the erection surface 28 and the inclined surface 25 in contact with each other, so that the abovementioned effect of preventing the accumulation of the ingredients can be enhanced.

Furthermore, as shown in FIG. 2(a), the bottom surface straight line part 31 of the blade part 21 is shifted from the center P1. Due to this configuration, the kneading element 2 can be formed such that the bottom surface curved part 131 and the bottom surface curved part 132 are connected with each other to form a smooth circular arc in the rotation direction rear end 31b of the bottom surface curved part 131 (i.e., the rotation direction front end 32a of the bottom surface curved part 132).

As shown in FIG. 2(b), the bottom surface curved part 132 of the blade part 22 is shifted to the inside of the ellipse S2 (toward the center P2 side) on the rotation direction rear side. Due to this configuration, the friction between the kneading element 2 and a dough mass can be reduced, and the effect of increasing the pressure applied to the dough mass can be expected.

Figure 3:
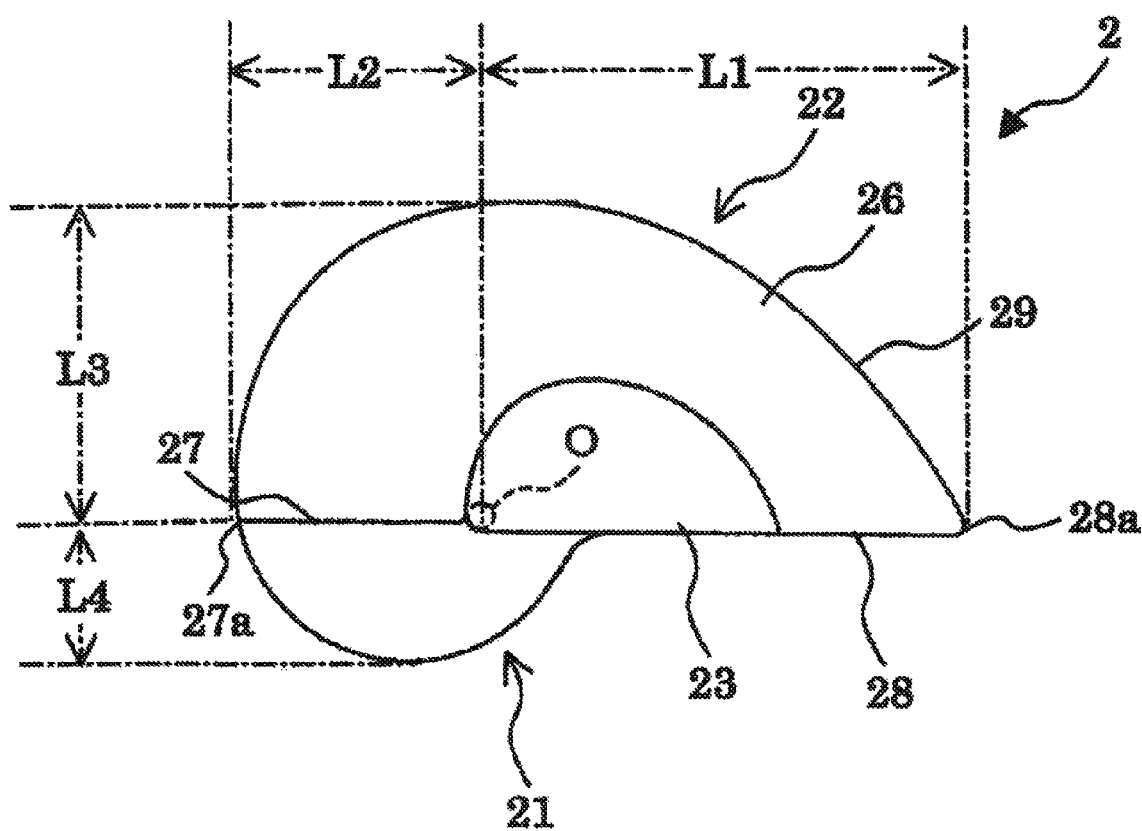
FIG. 3 is a plan view of the kneading element.

The sizes and the aspect ratios of the ellipse S1 and the ellipse S2, and the position of the shaft center O of the rotating shaft are set such that the length between the shaft center O and the bottom surface circumferential edge of the kneading element 2 gradually increases as the kneading element 2 rotates. Specifically, in FIG. 3 showing a plan view of the kneading element 2, the size and the like of the ellipse S1 are set such that "L1>L2" and "L3>L4" are established, respectively, in the relationship between the length L1 from the shaft center O to an outer edge 28a of the rotation direction rear end of the blade part 22 and the length L2 from the shaft center O to an outer edge (also the outer edge of the rotation direction rear end of the blade part 21) 27a of the rotation direction front end of the blade part 22, and in the relationship between the length L3 of a short direction of the blade part 22 and the length L4 of a short direction of the blade part 21.

Even when the dough enters and adheres between the kneading element 2 and the bottom surface within the pot, setting the relationships among the lengths L1 to L4 can further enhance the effect of efficiently scraping out the dough by means of a bottom surface outer circumference of the rotating kneading element 2 that gradually increases the rotation width thereof, whereby the dough can be removed immediately.

Note that the length L1 is set slightly shorter than the radius of the bottom surface within the pot.

According to an experiment, it is desired that the length L1 be 2.0 to 3.5 times the length L2, and therefore the length L1 is set to be approximately 2.5 times the length L2 herein.

Furthermore, it is desired that the length L3 be 1.0 to 2.5 times the length L4, and therefore the length L3 is set to be approximately 2 times the length L4 herein.

In addition, it is desired that the height of the kneading element 2 be 0.3 to 0.7 times the length L1, and that the inclination angle δ of the inclined surface 26 be 20° to 60°.

Note that although each of the magnifications described above is a standard magnification, the magnifications may be appropriately adjusted by observing the actual movement and the like of the dough mass. In general, these magnifications or the like may be increased as the length L1 becomes short.

Next, the shapes of the side surfaces of the blade part 21 and blade part 22 are described.

When each of the blade parts 21 and 22 is sectioned along a plain surface that is orthogonal to the bottom surface of the blade part (21, 22) and includes the rotating shaft, the cross section of the inclined surface (25, 26) in a partial area between the rotation direction front side of the blade part (21, 22) and the rotation direction rear side of the same is in the shape of a curve bending on the bottom surface side of the blade part (21, 22). The curvature of this curve gradually decreases from the rotation direction front side to the rotation direction rear side.

Figure 9:
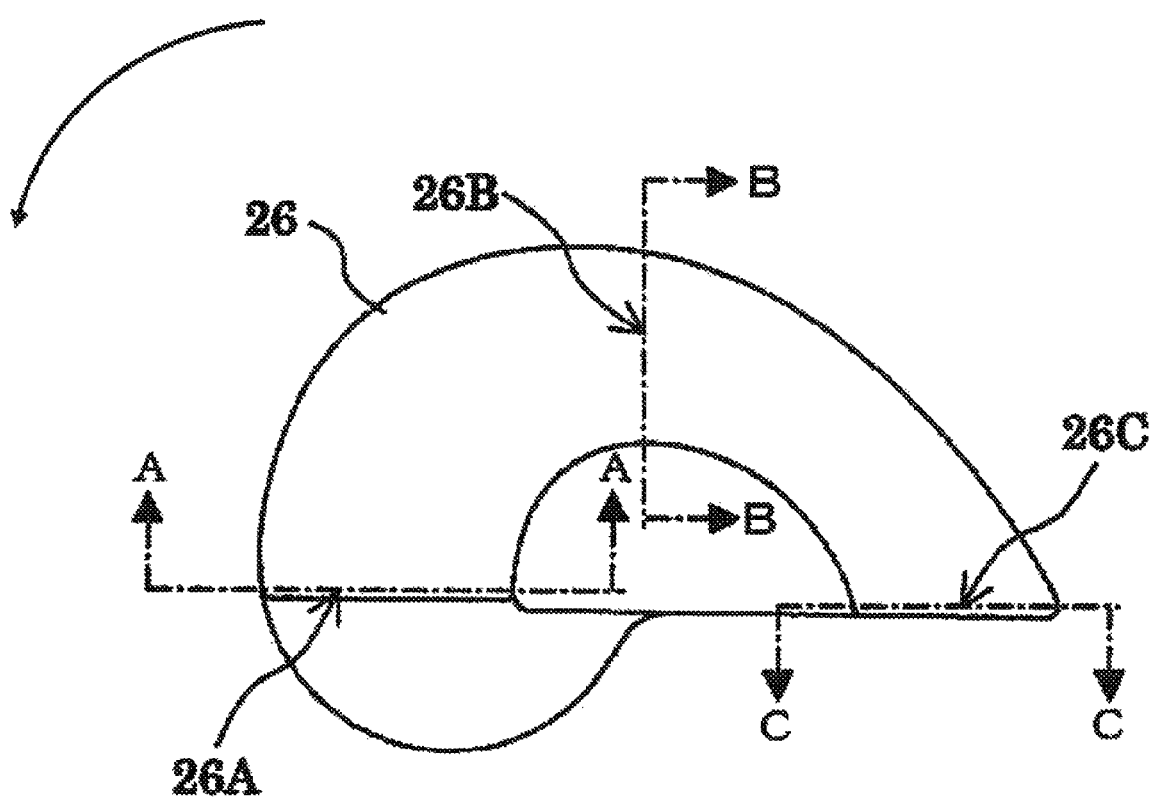
FIG. 9 is a plan view for illustrating the cross section of an inclined surface of the kneading element when sectioned along a plain surface including a rotating shaft.
Figure 10:
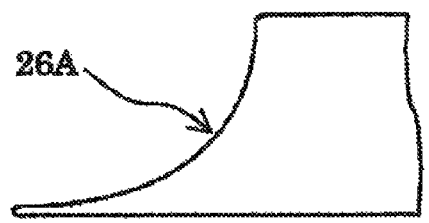
FIG. 10(a) is a vertical cross-sectional diagram taken along a line A-A shown in FIG. 9.
FIG. 10(b) is a vertical cross-sectional diagram taken along a line B-B shown in FIG. 9.
FIG. 10(c) is a vertical cross-sectional diagram taken along a line C-C shown in FIG. 9.
Figure 10:
Figure 10:
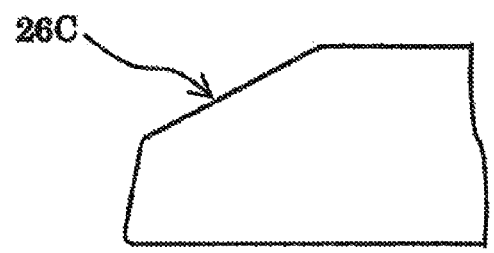

With reference to FIGS. 9 and 10, the shape of the inclined surface 26 is described as an example of the shape of the inclined surfaces.

FIG. 9 is a plan view of the kneading element 2, wherein the arrow represents the rotation direction of the kneading element 2. FIG. 10 is a diagram for illustrating the abovementioned cross section of the inclined surface 26, wherein (a) is a vertical cross-sectional diagram taking along a line A-A shown in FIG. 9, (b) is a vertical cross-sectional diagram taken along a line B-B shown in FIG. 9, and (c) is a vertical cross-sectional diagram taken along a line C-C shown in FIG. 9.

As shown in FIG. 10, the cross section of the inclined surface 26 is curved generally toward the bottom surface of the blade part 22, and the curvature thereof gradually decreases from the rotation direction front side of the kneading element 2 toward the rotation direction rear side.

In this manner, the cross section of the inclined surface 26 of the blade part 22 is shaped into a curve hollowed in the rotation direction front side, and the depth of this hollow gradually becomes narrow throughout the rotation direction rear side.

Note that although the cross section of the inclined surface 26 at the rotation direction rear end of the blade part 22 is in the shape of a substantially straight line, as shown by a curve 26C, for example, the inclined surface 26 may be formed into a curve bending on the opposite side of the bottom surface of the blade part 26 (upper surface side of the kneading element 2).

On the other hand, the cross section of the inclined surface 25 of the blade part 21 is formed into a curve bending to the bottom surface side of the blade part 21, as with the cross section of the inclined surface 26, and the curvature of the curve gradually decreases from the rotation direction front side of the kneading element 2 toward the rotation direction rear side of the same. Furthermore, in the present embodiment, the cross section of the inclined surface 25 at the rotation direction rear end of the blade part 21 is in the shape of a gentle curve bending on the opposite side of the bottom surface of the blade part 21, but may be formed into a substantially straight line.

By employing the cross sections of the inclined surfaces described above, the ingredients and dough mass that are placed on the inclined surfaces as a result of the rotation of the kneading element 2 can be guided to the rotation direction rear side along the inclined surfaces. Due to the synergetic effect with the erection surface 29 that increases in height from the rotation direction front side toward the rotation direction rear side, especially the inclined surface 26 of the blade part 22 can vigorously throw the dough mass that is guided to the rotation direction rear side along the inclined surface 26, toward the upper side of an inner wall (circumferential surface) of the pot. As a result, great pressure can be applied directly from the entire area of the inner wall of the pot to the dough mass.

The position for forming the erection surface 27 is described next.

In the embodiment described above, the erection surface 27 provided in the rotation direction back surface of the blade part 21 is formed such that the straight line passing through the outer edge 27a of the erection surface 27 and the shaft center O of the rotating shaft is substantially parallel to the straight line passing through the outer edge 28a of the erection surface 28 and the shaft center O of the rotating shaft, in the rotation plain surface of the kneading element 2, as shown in FIG. 1.

Figure 11:
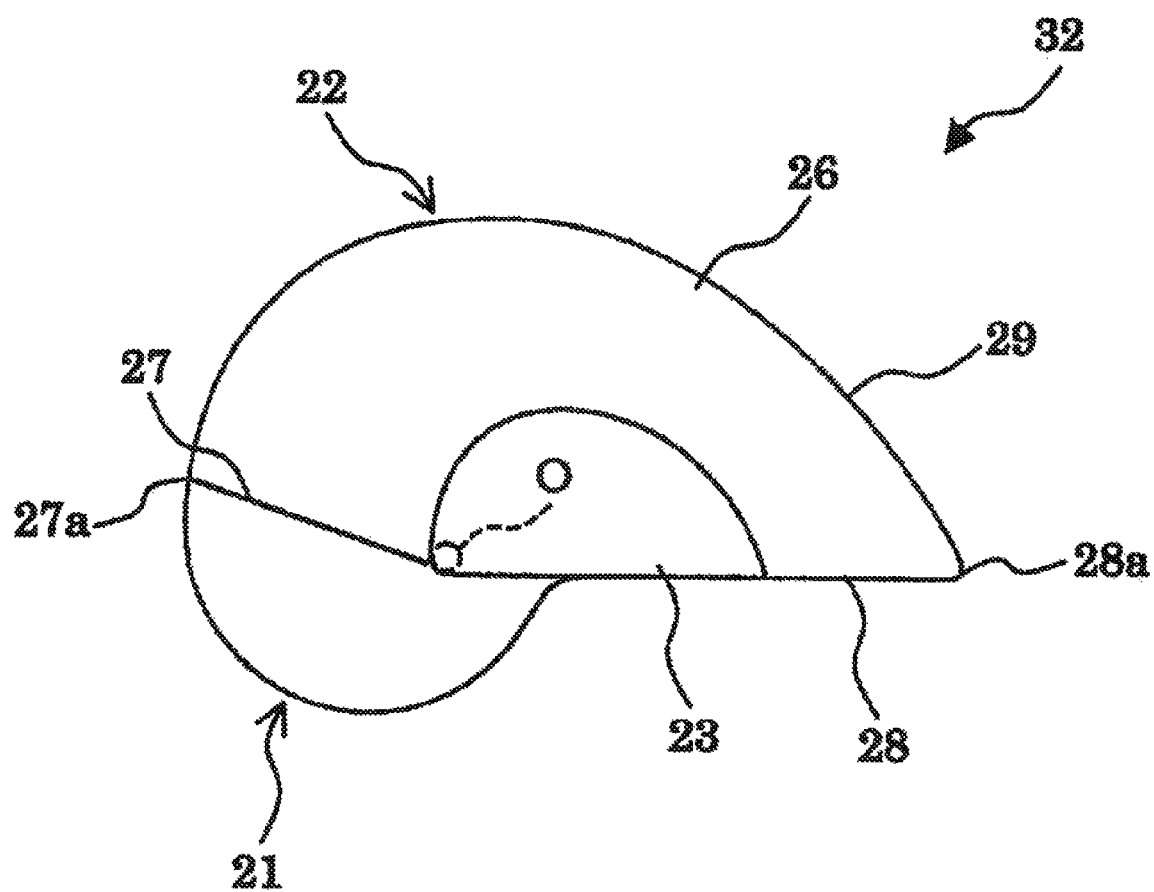
FIG. 11 is a plan view showing another embodiment of the kneading element of a kneader according to the present invention.

However, FIG. 11 shows an example in which the erection surface 27 is formed such that the outer edge 27a of the erection surface 27 is positioned on the blade part 22 side from the straight line passing through the shaft center O of the rotating shaft along the erection surface 28.

Figure 12:
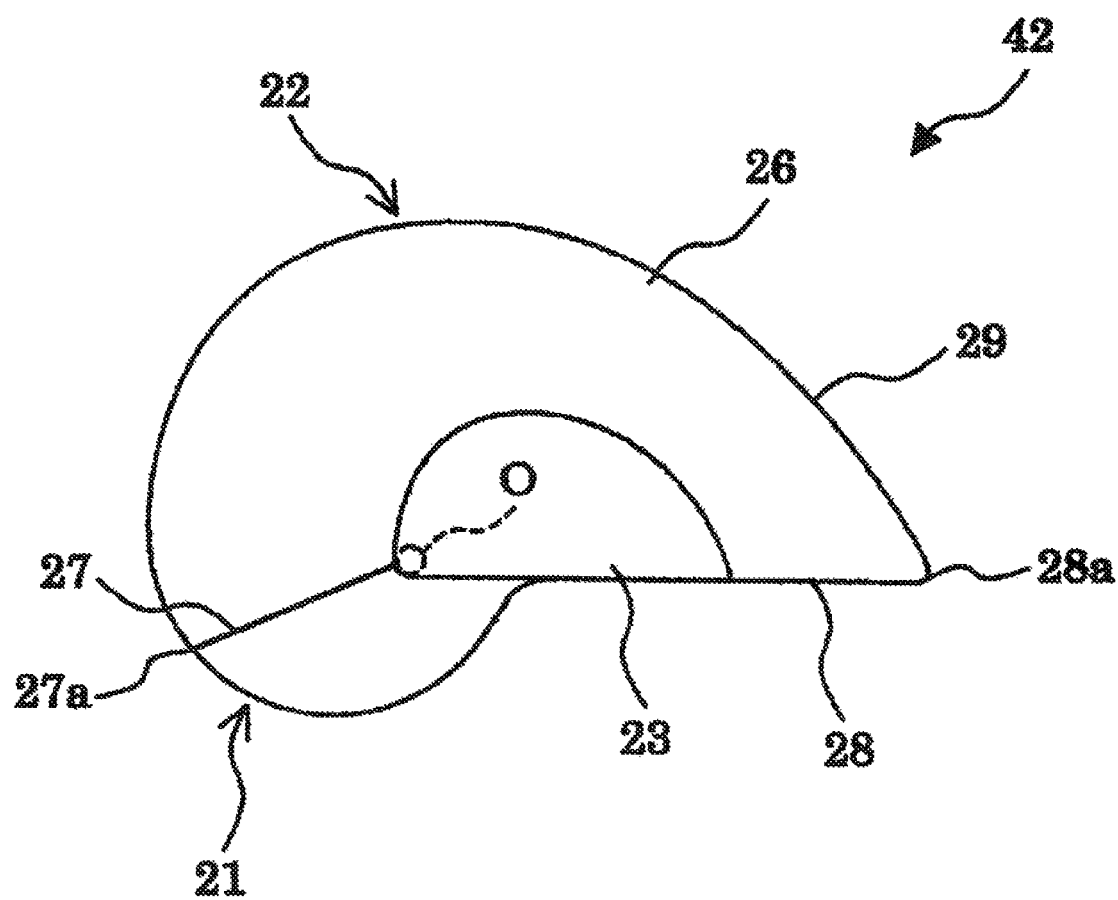
FIG. 12 is a plan view showing yet another embodiment of the kneading element of a kneader according to the present invention.

On the other hand, FIG. 12 shows an example in which the erection surface 27 is formed such that the outer edge 27a of the erection surface 27 is positioned on the blade part 21 side from the straight line passing through the shaft center O of the rotating shaft along the erection surface 28.

The difference in the positions for forming the erection surface 27 in relation to the erection surface 28 is defined based on whether the effect of dropping the dough mass by means of the erection surface 27 is provided in a later stage (FIG. 11) or in an early stage (FIG. 12). Therefore, the position for forming the erection surface 27 in relation to the erection surface 28 may be optimized appropriately in accordance with the amount and quality of the ingredients.

Figure 13:
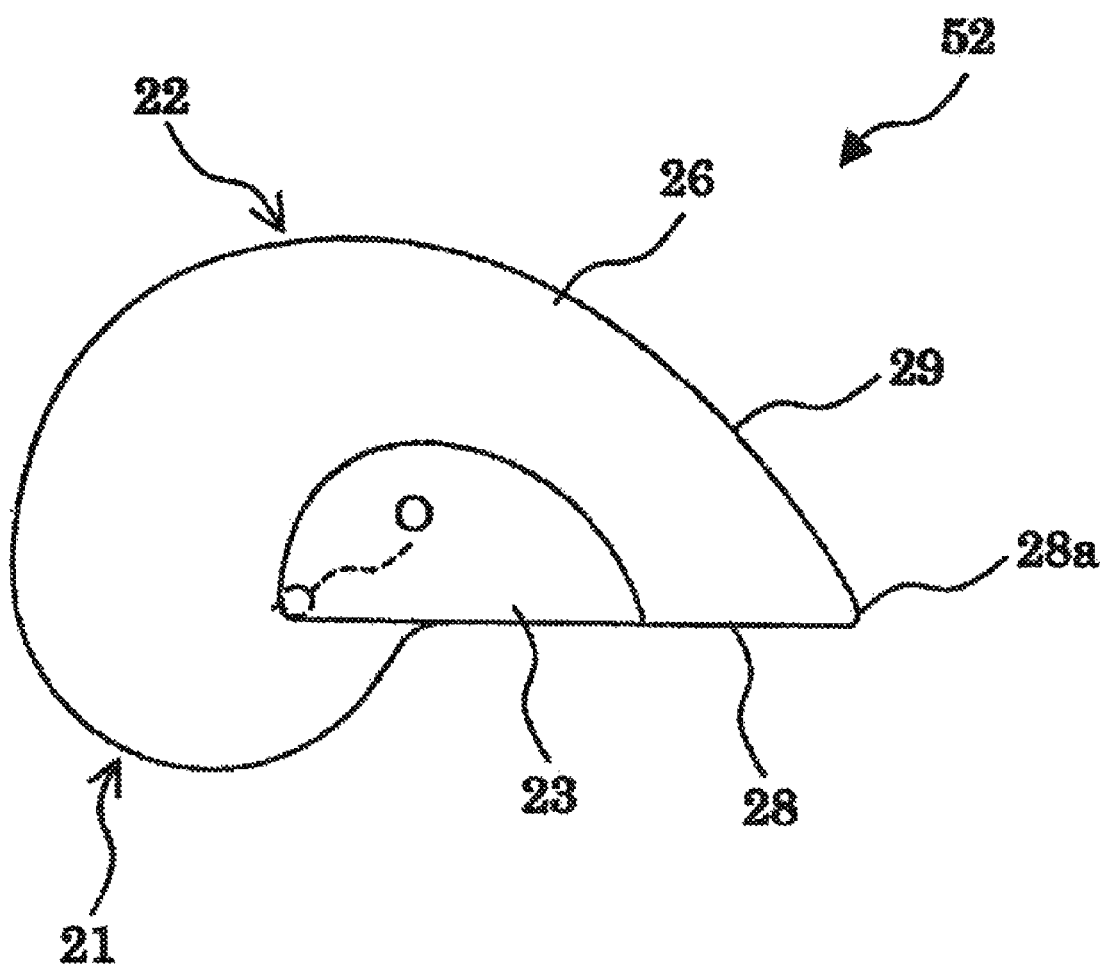
FIG. 13 is a plan view showing yet another embodiment of the kneading element of a kneader according to the present invention.

Note that the presence of the erection surface 27 causes a problem of allowing adhesion of the dough ingredients to the erection surface 27 and making it difficult to clean this section. Therefore, in the kneading element according to the present invention, the erection surface 27 may not be provided, as shown in FIG. 13. According to this configuration, unlike the kneading element having the abovementioned erection surface 27, the kneading effect is reduced because the dough mass is no longer dropped by the erection surface 27, but the kneading effect is improved by the rolling motion of the dough mass on the kneading element.

An embodiment of the kneader according to the present invention is described next.

Figure 14:
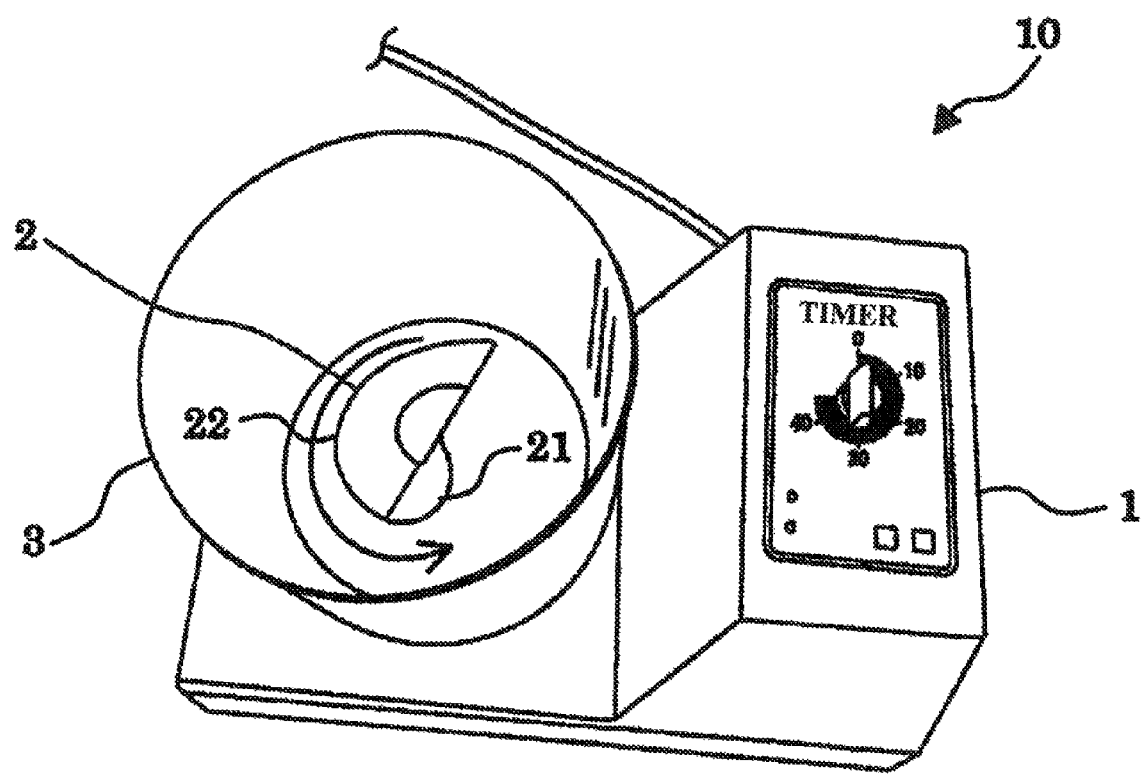
FIG. 14 is a perspective view showing an embodiment of a kneader according to the present invention.

FIG. 14 is a perspective view showing an embodiment of the kneader according to the present invention.

A kneader 10 has a kneader main body 1, the kneading element 2 and a pot 3.

The kneader main body 1 has drive means (not shown) for rotating the kneading element 2, a button used by a user to instruct the kneading element 2 to start, stop, restart and end rotating, and a dial for setting a rotation time of the kneading element 2.

The kneading element 2 is a member for kneading ingredients within the pot, and the previously described kneading element according to the present invention is used.

The pot 3 is a kneading container into which the ingredients are thrown. Note that the projected parts of the pot of the conventional kneader do not exist in an inner circumferential surface of the pot 3.

Here, the kneader 10 assumes that the amount of dough to be approximately 400 to 600 g. Therefore, the pot 3 has an inner diameter of, for example, 23.0 cm, and a height of 15.0 cm. The kneading element 2 has a length in the longitudinal direction of 12.5 cm, and a height of 3.1 cm.

Note that the amount of dough or the size of the pot in the kneader 10 are not limited to the values described above, and may be optimized appropriately.

Further, the pot 3 may be in the substantially cylindrical shape, or may be shaped such that the diameter of a bottom part area gradually increases toward the upper side.

The kneading element 2 has a concave part for receiving the rotary driving shaft provided in the center of the pot 3, wherein the rotary driving shaft is inserted into the concave part, and the kneading element 2 is rotary driven by the drive means, in the direction of the arrow shown in the diagram.

Note that although the present embodiment is configured to knead the ingredients within the pot 3 by rotary driving the kneading element 2, the present embodiment may be configured to rotate the pot 3 without rotating the kneading element 2, or to rotate both the kneading element 2 and the pot 3. When rotating both the kneading element 2 and the pot 3, they may be rotated in the directions opposite from each other, or rotated in the same direction at different speeds.

Furthermore, the rotation speed of the kneading element 2 or the pot 3 may be constant, or intermittently controlled or fluctuated when punching the dough down or in accordance with a change in the situation where the flour included in the ingredients is gradually mixed with water. Moreover, the kneader 10 may be provided with a sensor for monitoring the state where the dough is kneaded, as well as means for controlling the speed in accordance with the kneading state monitored by the sensor.

The following describes a situation where the ingredients thrown into the pot 3 are kneaded as the kneading element 2 rotates.

As a result of rotation of the kneading element 2, the ingredients thrown into the pot 3 are scooped up by a bottom surface outer circumferential edge and the inclined surface 25 of the blade part 21, rise in a direction of the top surface 23 while moving on the inclined surface 25, and are dropped by gravity at the erection surface 27. The ingredients that are dropped by the first erection surface 27 are scooped up by a bottom surface outer circumferential edge and the inclined surface 26 of the blade part 22, rise in the direction of the top surface 23 while moving on the inclined surface 26, and are dropped by gravity at the erection surface 28. At the same time, the ingredients are pressurized by the inclined surfaces 25, 26 and the erection surface 29, in a direction of the inner circumferential surface of the pot.

By repeating the motions described above, the ingredients are mixed within the pot 3 and bunched up together from a powdery form to a ball gradually, which is then further kneaded.

Here, when the dough enters and adheres to the space between the kneading element 2 and the bottom surface within the pot 3, the entering dough is scraped out, in a pot inner circumferential surface direction, by the bottom surface outer circumferential edge that extends from the rotation direction front end 21a of the blade part 21 to the rotation direction rear end 22b of the blade part 22.

Moreover, the dough that enters and remains in the space between the kneading element 2 and the bottom surface within the pot 3 without being scraped out adheres to a "dough mass that is gradually formed as the kneading element 2 rotates," which is dropped in the erection surface 28 of the blade part 22. The remaining dough is then removed immediately.

A lower part area of the dough mass that is gradually formed as the kneading element 2 rotates is embedded into a wedge shape by the bottom surface outer circumferential edge of the kneading element 2, whereby, first, the lower part area is pressurized. Next, the dough mass is placed on the side surfaces (inclined surfaces 25, 26) of the kneading element 2 and pressurized by the side surfaces while rotating. Thereafter, the dough mass is dropped at the bluffy erection surface at the rotation direction rear end. This motion is repeatedly performed back and forth between the blade part 21 and the blade part 22, i.e., from the blade part 21 to the blade part 22, from the blade part 22 to the blade part 21, and again from the blade part 21 to the blade part 22.

The dough mass is pressed, in the inner circumferential surface direction of the pot 3, by centrifugal force generated by the kneading element 2 and the pressure applied from the side surfaces of the kneading element 2, and at the same time receives pressure from the inner circumferential surface of the pot 3, as a stress.

The dough mass normally has a size enough to cover the kneading element 2. Therefore, a space formed by the erection surface 28 of the kneading element 2 and the bottom surface of the pot 3 becomes decompressed, and the dough mass is rotated in a direction opposite to the rotation direction of the kneading element 2. As a result, the dough mass in this area is drawn into this space and folded such as to roll over.

In this manner, so-called "hand kneading" where "kneading" is repeatedly performed without cutting the dough mass or applying friction to the surface of the dough mass is performed.

As described above, because the kneading element of the present invention has an extremely excellent kneading effect, a good dough mass can be created easily in a short time, the dough mass including a "buckwheat noodle dough" which was difficult to make using the conventional kneader.

In order to further increase the pressure applied from the kneading element 2 to the dough mass and to further increase the pressure applied from the inner circumferential surface of the pot 3 to the dough mass, the height of the erection surface 29 or the kneading element 2 may be adjusted (increased). Further, the inclination angle δ of the side surface of the rotation direction rear end 22b of the blade part 22 (see FIG. 5) may be further increased. In addition, the cross section of the inclined surface 26 may be shaped into a straight line or a curve bending so as to project outward (in a direction of the upper surface of the kneading element 2).

In recent years, various bread machines (home bakeries, etc.) capable of automatically perform the steps ranging from "kneading" to "baking" are becoming more widespread. These bread machines are convenient as they can bake bread without effort.

However, a disadvantage of a conventional bread machine is that because the conventional bread machine does not use an appropriate blade (kneading element), good kneading cannot be carried out, and therefore sufficiently elastic and viscous gluten cannot be formed. Bouncy and fluffy bread cannot be made without an appropriate amount of good gluten. Furthermore, because the conventional bread machine bakes dough while keeping the blade in the pot, a large hole is formed at the bottom of the baked bread due to the presence of the blade, impairing the appearance of the bread and reducing appetite.

Therefore, a dough mass may be created using the kneading element of the present invention, and thereafter the entire pot may be replaced with a baking pot. Alternatively, a single bread machine may be configured by both "a kneading pot having the kneading element of the present invention" and the "baking pot."

Hereinafter, an embodiment of the bread machine according to the present invention is described.

Figure 15:
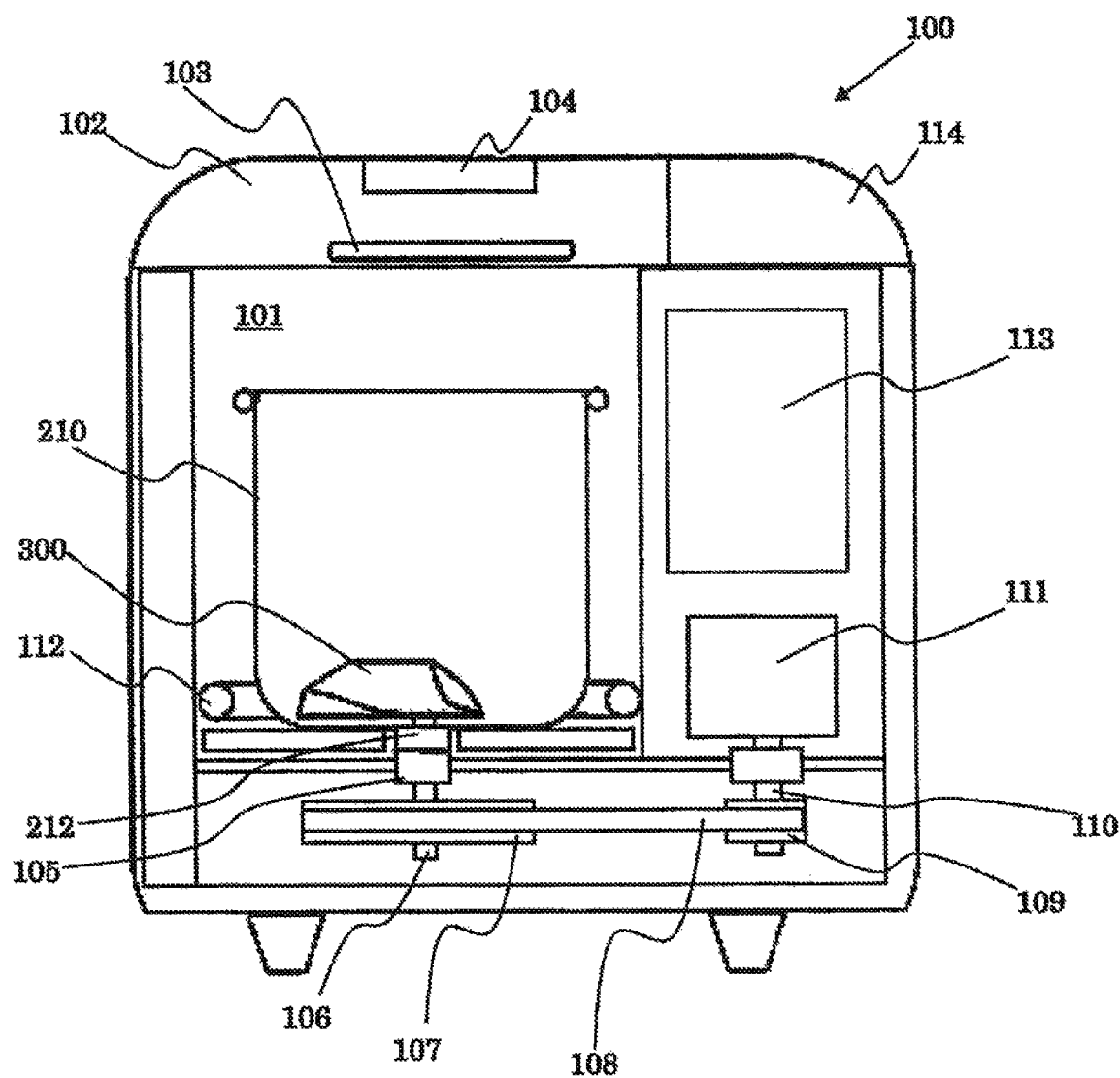
FIG. 15 is a partial cross-sectional diagram showing an embodiment of a bread machine according to the present invention.
Figure 16:
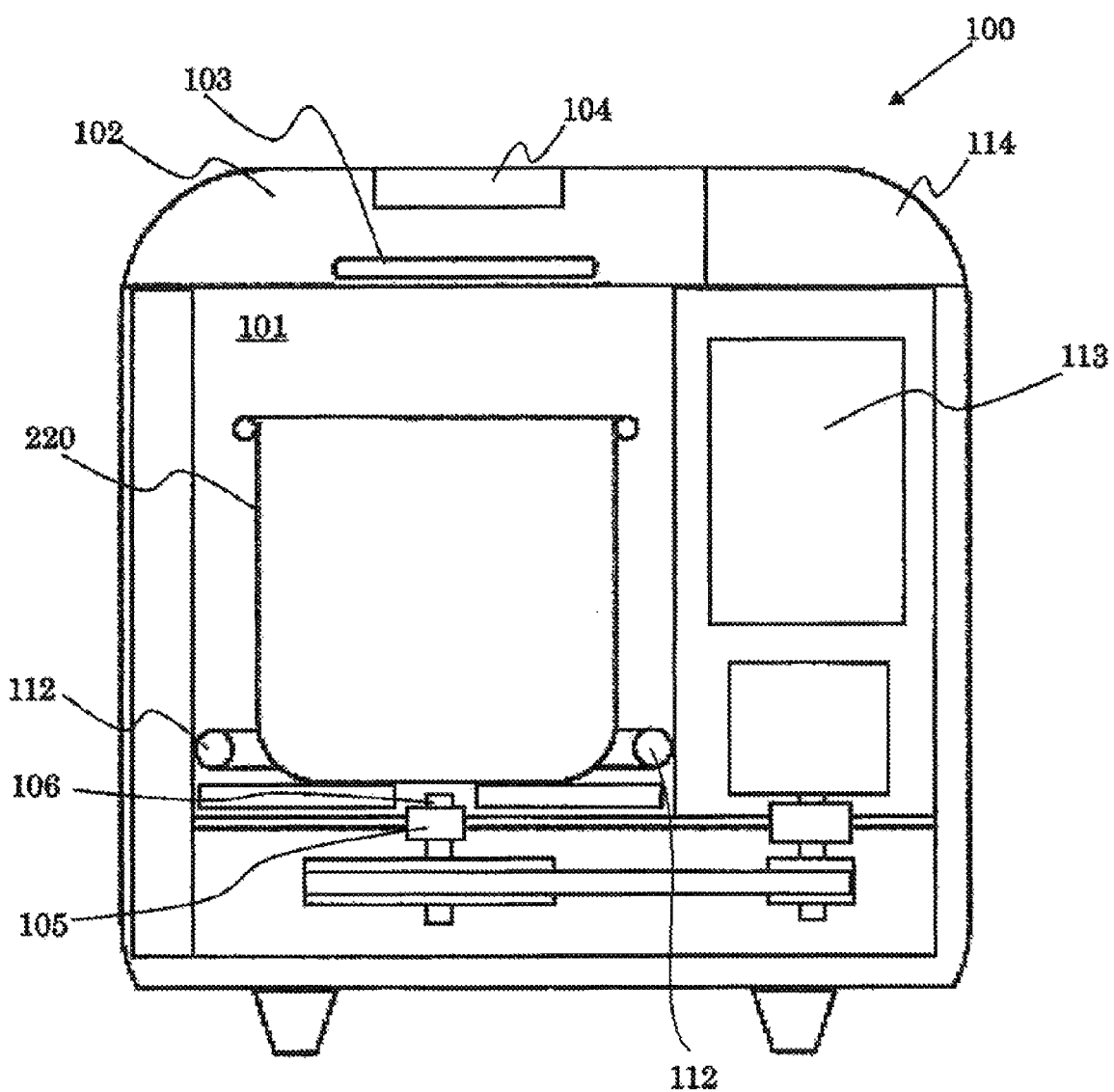
FIG. 16 is another partial cross-sectional diagram of the bread machine.

FIGS. 15 and 16 are partial cross-sectional diagrams of the bread machine according to the present invention, schematically showing an embodiment of the bread machine.

The inside of a bread machine 100 is provided with a baking chamber 101 having disposed therein a pot for putting bread ingredients therein. Here, there are two types of pots: a kneading pot 210 used for kneading the bread ingredients, and a baking pot 220 used for heating the kneaded bread ingredients. Both of the pots are shaped into a bottomed cylindrical body.

Both the kneading pot 210 and the baking pot 220 are disposed detachably within the baking chamber 101. FIG. 15 shows a state in which the kneading pot 210 is disposed, and FIG. 16 a state in which the baking pot 220 is disposed.

The baking chamber 101 is covered with an openable/closable lid 102. The lid 102 is provided with a handle 103 for opening and closing the lid 102, and an observation window 104 used by the user of the bread machine 100 to visually observe a bread making state within the baking chamber 101.

Figure 17:
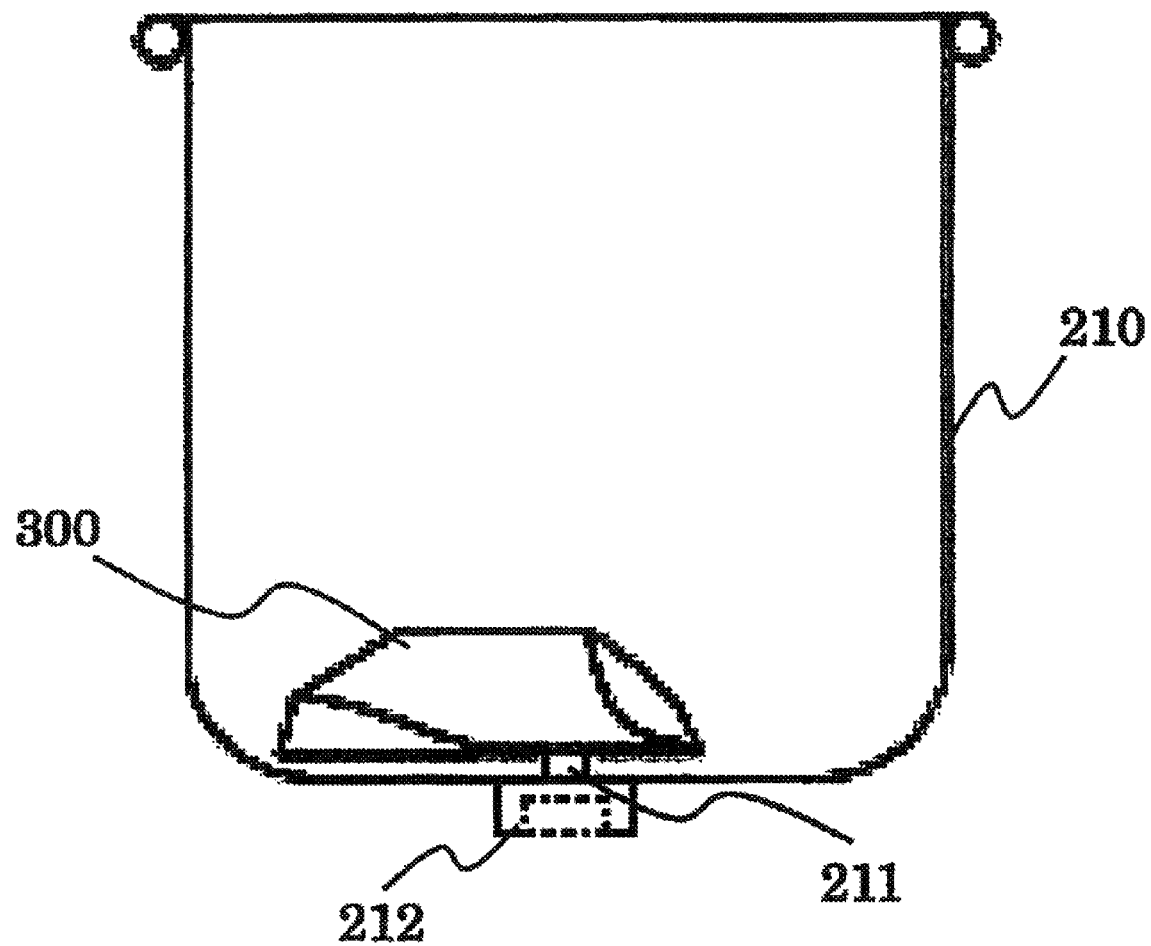
FIG. 17 is a schematic diagram for illustrating the configuration of a kneading pot installed in the bread machine.

FIG. 17 is a schematic diagram for illustrating the configuration of the kneading pot.

A kneading element 300 for kneading the bread ingredients is disposed in an inner bottom surface of the kneading pot 210. The center of a bottom surface of the kneading pot 210 is provided with a driven shaft 211. One end of the driven shaft 211 is inserted into a concave part provided in a bottom surface of the kneading element 300, while the other end of the driven shaft 211 is attached to a driven connector 212 provided in an outer bottom surface of the kneading pot 210.

The driven connector 212 has a concave part. When the kneading pot 210 is secured in the baking chamber 101 by using means that is not shown, one end of a driving shaft 106 attached to a driving connector 105 is fitted into the concave part of the driven connector 212.

The kneading element 300 is rotary driven by a motor 111 using the driven shaft 211, driven connector 212, driving connector 105, driving shaft 106, a large pulley 107, a belt 108, a small pulley 109, and a motor shaft 110.

Note that the above-described kneading element according to the present invention is used as the kneading element 300.

Figure 18:
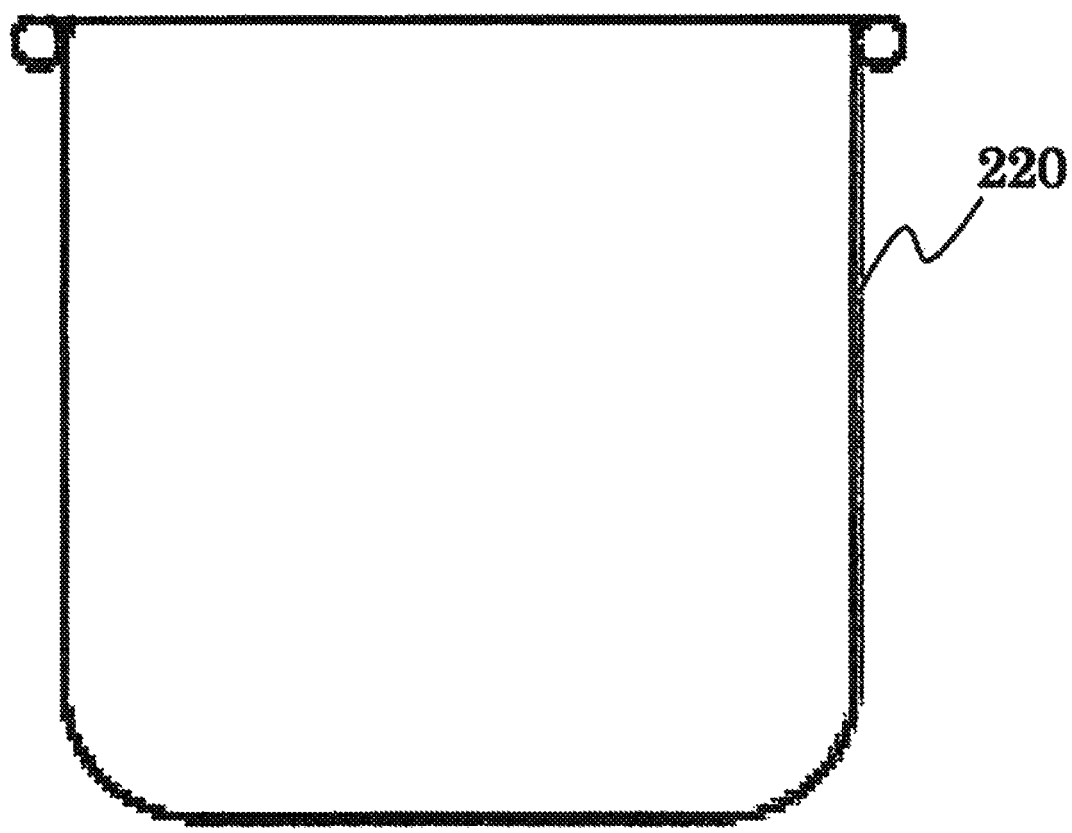
FIG. 18 is a schematic diagram for illustrating the configuration of a baking pot installed in the bread machine.

FIG. 18 is a schematic diagram for illustrating the configuration of the baking pot.

An inner surface of the baking pot 220 is not provided with any projection such as the driven shaft 211 provided in the kneading pot 210.

When the baking pot 220 is secured in the baking chamber 101 by using means that is not shown, the baking pot 220 is heated by a heater 112 which is heating means provided in the bread machine 100.

Note that the kneading pot and the baking pot shown in FIGS. 17 and 18 respectively are shaped into a hollow cylinder having a substantially constant diameter from the upper side of each pot throughout the lower side of the same. However, the shape of each pot is not limited thereto, and therefore each pot may be shaped into, for example, a hollow cylinder in which the diameter of a lower area thereof gradually increases from a bottom surface toward an upper side, but the diameter of an upper area of the same has a constant diameter.

The motor 111 and the heater 112 are operated by a command of a control circuit 113, which is control means provided within the bread machine 100, and carry out a kneading step, a maturing step, a punching down step, a finish fermentation step, a baking step and the like on the bread ingredients.

A control panel 114 provided with various buttons and timers used by the user of the bread machine 100 to operate the bread machine is disposed in an upper surface of the bread machine 100. The control circuit 113 issues a command for operating the motor 111 and the heater 112 on the basis of a signal or the like sent from the control panel 114.

The bread making steps by the bread machine 100 are described hereinafter.

(Kneading Step)

The kneading step employs a so-called sponge dough procedure where the ingredients are kneaded twice in order to allow efficient hydration of the ingredients.

Note that a predetermined downtime is provided between the first kneading and the second kneading.

(Maturing Step 1)

Next, the kneaded product is matured for a predetermined period of time, while keeping the temperature of the inside of the kneading pot 210 at a predetermined fermentation temperature.

(Punching Down Step 1)

Next, the risen dough obtained in the maturing step (1) is smashed, and the kneading element 300 is rotated for a little while to remove the gas contained in the dough.

(Maturing Step 2)

Next, the kneaded product is matured for a predetermined period of time, while keeping the temperature of the inside of the kneading pot 210 at a predetermined fermentation temperature.

(Punching Down Step 2)

Next, the risen dough obtained in the maturing step (2) is smashed, and the kneading element 300 is rotated for a little while to remove the gas contained in the dough.

(Replacement of Dough Mass)

Next, after completion of the punching down steps, the pots are replaced with each other by extracting the kneading pot 210 from the baking chamber 101 and installing the baking pot 220 in the baking chamber 101. Further, the dough mass within the kneading pot 210 is placed in the baking pot 220. Replacement of the dough mass is performed with human hands. Either of the replacement of the pots and the replacement of the dough mass may be carried out first.

Note that the bread machine 100 may be provided with informing means for informing the user using the bread machine 100 of the completion of the punching down step.

(Finish Fermentation Step)

Next, the dough mass is left in the slightly warmed up baking pot 220 for a predetermined time period to perform the finish fermentation.

(Baking Step)

Next, the temperature of the inside of the baking pot 220 is set at a predetermined first temperature, and the dough is baked for a predetermined time period. Thereafter, the temperature within the baking pot 220 is raised to a second temperature higher than the first temperature, and the dough is baked for another predetermined time period.

Through these steps described above, the bread machine 100 can carry out the operations ranging from kneading of the bread ingredients to baking bread.

Because the kneading element 300 used by the bread machine 100 to knead the bread ingredients is the above-described kneading element according to the present invention, not only is it possible to perform good kneading on the dough, but also sufficiently elastic and viscous gluten can be formed, whereby fluffy bread can be created.

Furthermore, because there is no projected parts on the inner surface of the baking pot 220 and the kneading element is not attached to the inside of the pot, a large hole is not formed at the bottom of the baked bread, which happens in the abovementioned conventional bread machines.

Figure 19:
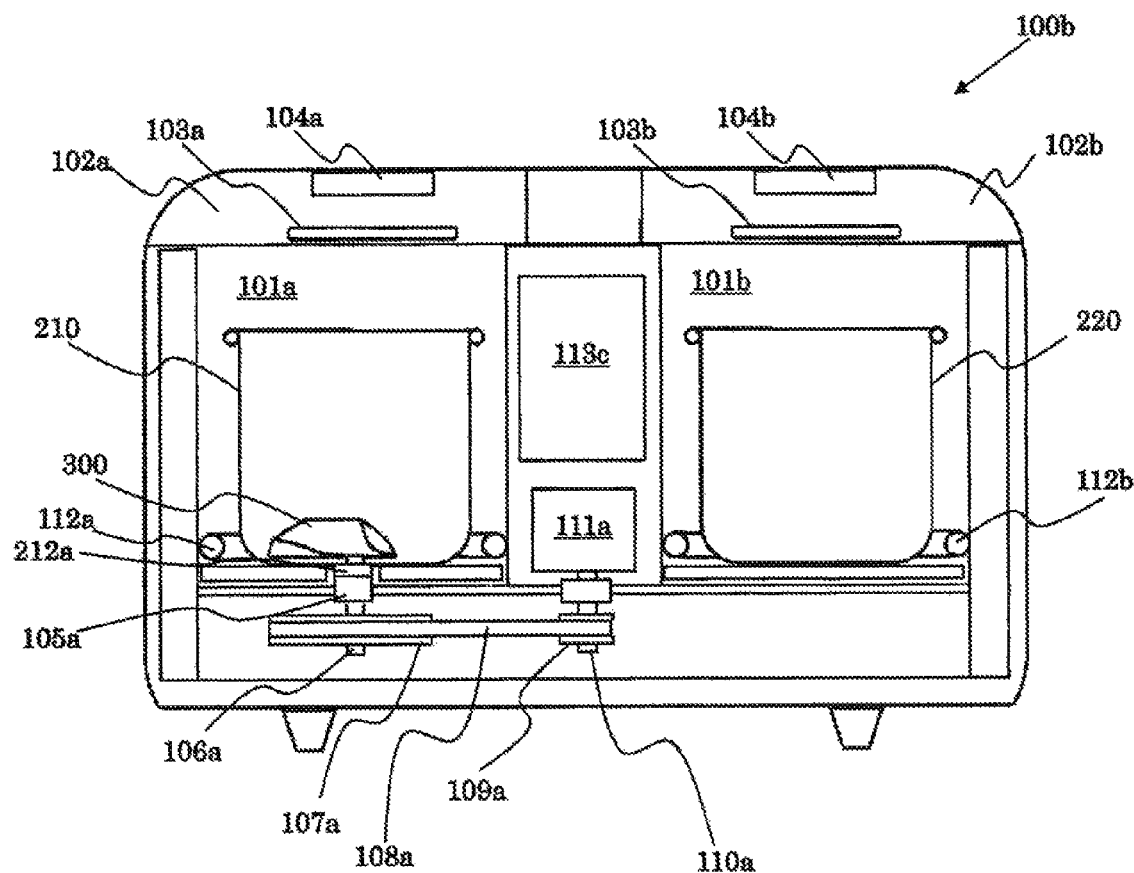
FIG. 19 is a partial cross-sectional diagram showing another embodiment of the bread machine according to the present invention.
Figure 20:
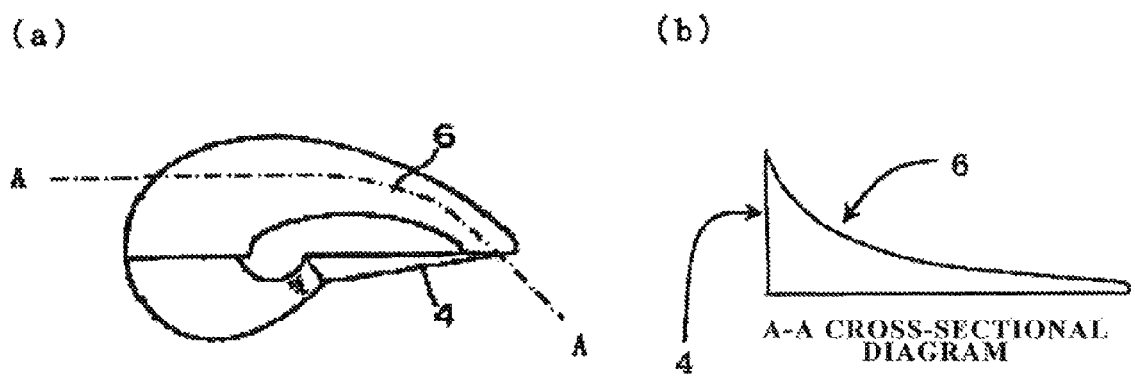
FIG. 20 shows an embodiment of a kneading element of a conventional kneader, wherein (a) is a plan view and (b) is a cross-sectional diagram taken along a line A-A shown in the plan view (a)

Note that the bread machine described above is configured such that the kneading pot and the baking pot can be replaced with each other, but the bread machine according to the present invention is not limited thereto. For example, as shown in FIG. 19, the bread machine according to the present invention may be configured such that the kneading pot and the baking pot can be provided together.

A bread machine 100b has a kneading/maturing chamber 101a installed with the kneading pot 210, and a baking chamber 101b installed with the baking pot 220. A space 101a is covered with an openable/closable lid 102a. The baking chamber 101b is covered with an openable/closable lid 102b.

As with the embodiment shown in FIG. 15, the kneading element 300 is rotary driven by a motor 111a using a driven shaft, driven connector 212a, driving connector 105a, driving shaft 106a, large pulley 107a, belt 108a, small pulley 109a, and motor shaft 110a.

On the other hand, the baking pot 220 is heated by a heater 112b.

Note that the motor 111a and the heaters 112a, 112b are operated in response to a command issued by a control circuit 113c. Note that the control circuit 113c issues a command based on a signal or the like sent from a control panel (not shown) of the bread machine 100b.

The bread making steps by this bread machine 100b provided with both of the pots are substantially the same as the bread making steps described above. However, it is not necessary to replace the pots during the step of replacing the dough mass.

Next, for yet another embodiment of the kneading element of a kneader, the kneader, and the bread machine according to the present invention, the sections that are different from the embodiments described above will mainly be described.

Unlike the kneading element of the above-described embodiments where the two blade parts having substantially semi-elliptical bottom surface peripheral edges are formed like being bonded with each other, the kneading element of a kneader according to this embodiment has one blade part having a substantially semi-elliptical bottom surface circumferential edge.

Figure 22:
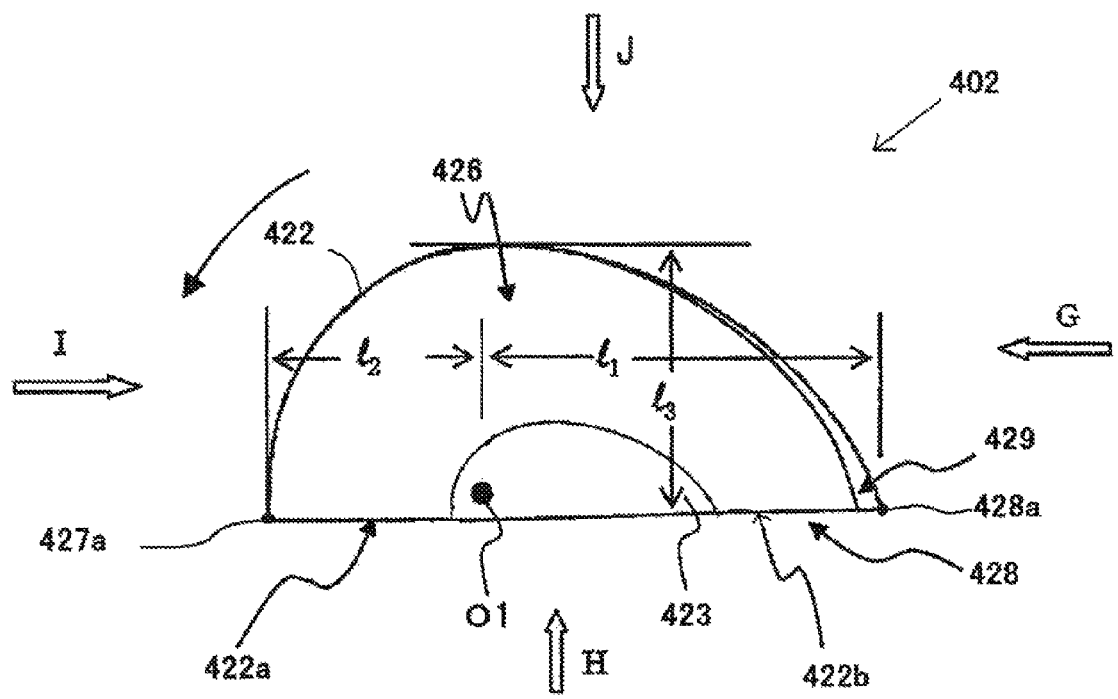
FIG. 22 is a plan view of the kneading element of a kneader shown in FIG. 21.

FIG. 22 is a plan view showing an embodiment of a kneading element.

The arrow of the diagram represents the rotation direction of a kneading element 402. Reference numeral O1 represents a shaft center of a rotating shaft.

The kneading element 402 has a blade part 422 having a substantially semi-elliptical bottom surface circumferential edge.

An inclined surface 426 is formed in a side surface of the blade part 422. The inclined surface 426 is formed in the area from a top surface 423 of the kneading element 402 throughout a bottom surface 424 to form a radial shape extending from a circumferential edge of the top surface 423 toward a bottom surface outer edge of the blade part 422.

Note that the kneading element 402 is formed such that a rotation direction front end 422a and rotation direction rear end 422b of the inclined surface 426 are positioned on a substantially straight line.

Figure 27:
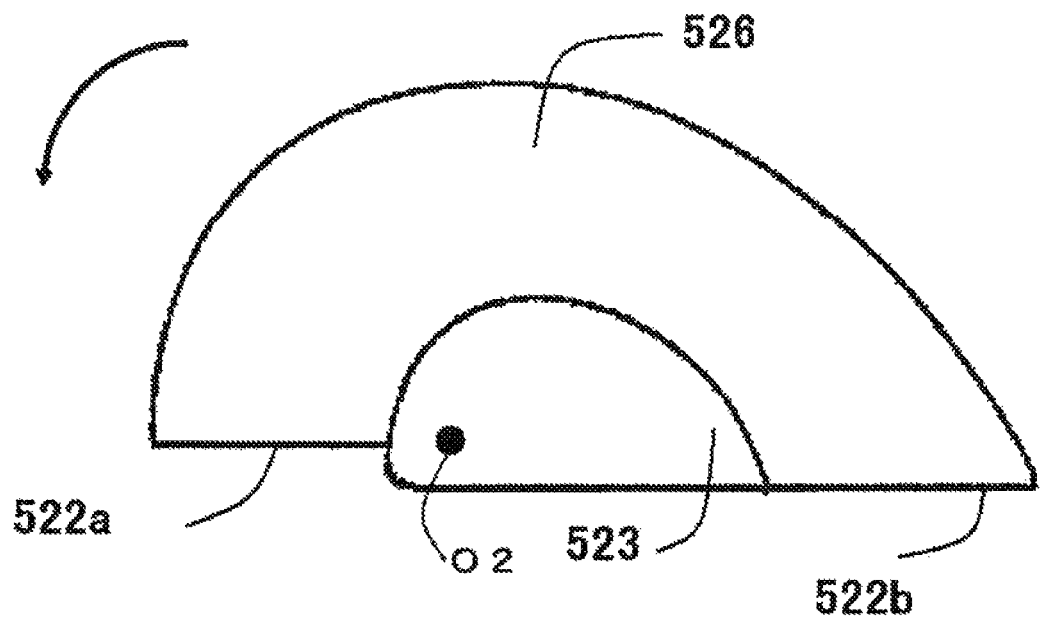
FIG. 27 is a plan view showing yet another embodiment of the kneading element of a kneader according to the present invention.

As shown in FIG. 27, the positional relationship between the rotation direction front end and the rotational direction rear end of the inclined surface may be configured such that a rotation direction front end 522a is positioned behind the rotation direction rear end 522b in the rotation direction. In other words, the rotation direction front end 522a and the rotation direction rear end 522b are not positioned on a substantially straight line.

Figure 28:
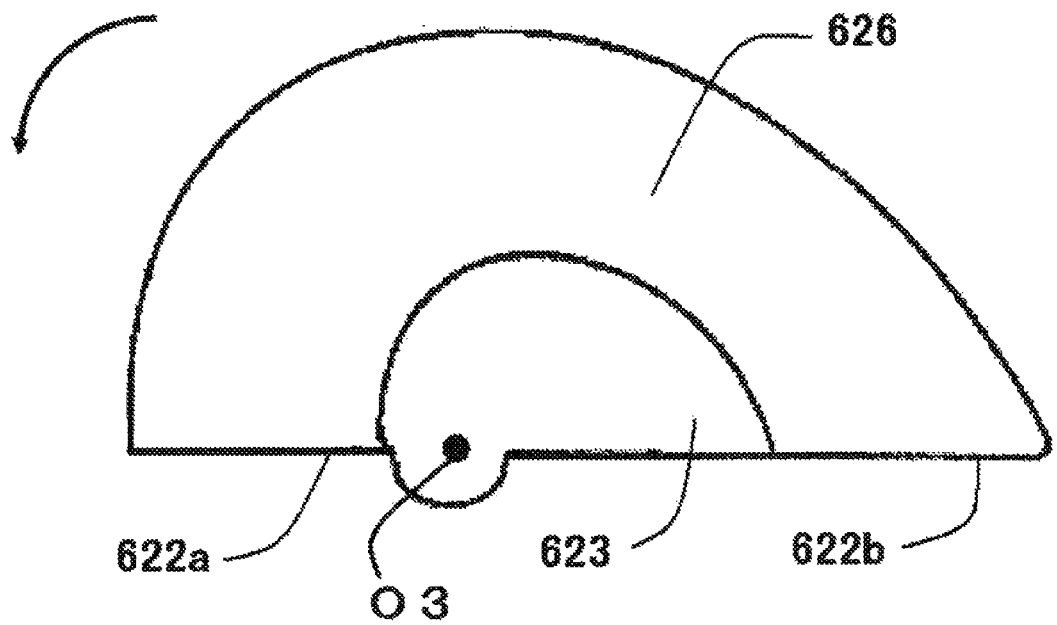
FIG. 28 is a plan view showing yet another embodiment of the kneading element of a kneader according to the present invention.

As shown in FIG. 28, the kneading element may be formed such that a rotation direction front end 622a and a rotation direction rear end 622b are positioned on a substantially straight line, and that a shaft center O3 of the rotating shaft is provided on a straight line connecting these rotation direction front end and the rotation direction rear end.

Figure 29:
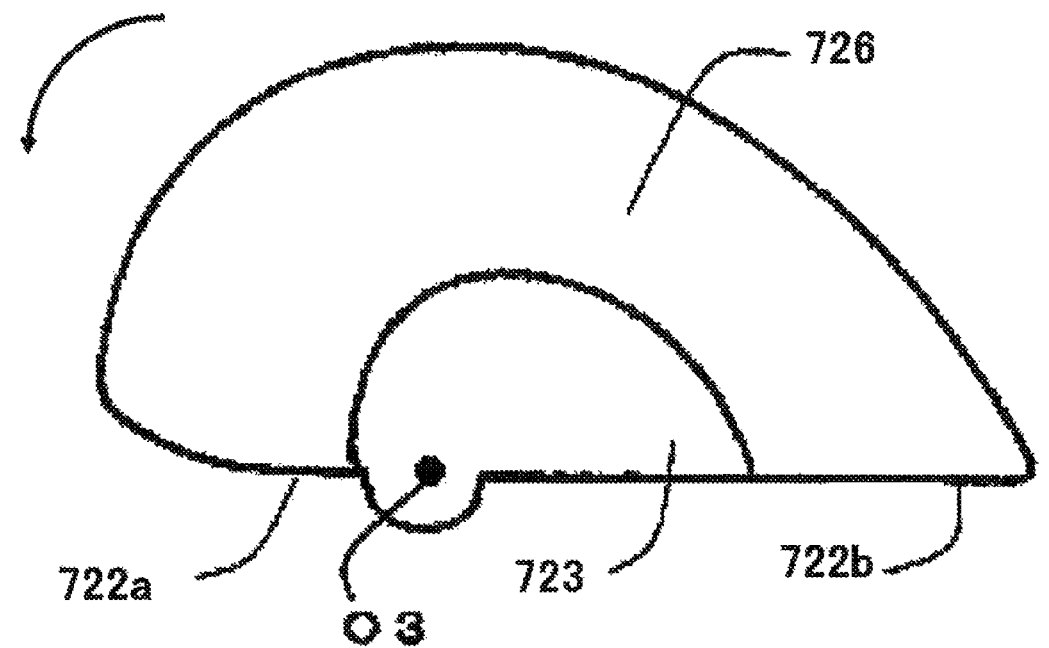
FIG. 29 is a plan view showing yet another embodiment of the kneading element of a kneader according to the present invention.

Furthermore, as shown in FIG. 29, the kneading element may be formed such that a rotation direction front end 722a of an inclined surface is formed into a curve. In other words, for example, the rotation direction front end of the inclined surface may be formed such that the bottom surface circumferential edge side of the kneading element is positioned behind the top surface side in the rotation direction.

FIGS. 27 to 29 are plan view of the kneading element, wherein the arrow of each diagram represents the rotation direction of the kneading element.

Figure 23:
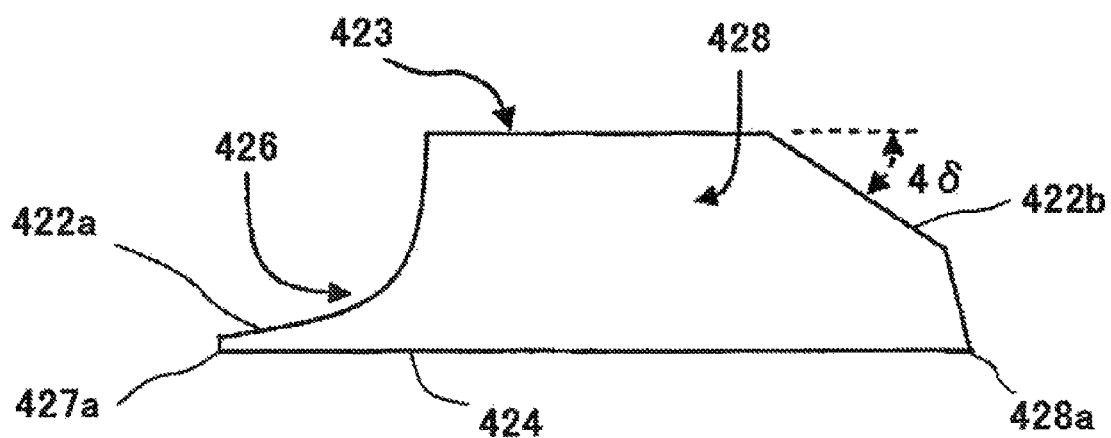
FIG. 23 is a front view of the kneading element of a kneader shown in FIG. 21.

FIG. 23 is a front view of the kneading element 402 (viewed from an H direction of FIG. 22). Reference numeral 4δ represents a side surface inclination angle of the rotation direction rear end 422b of the blade part 422.

Figure 25:
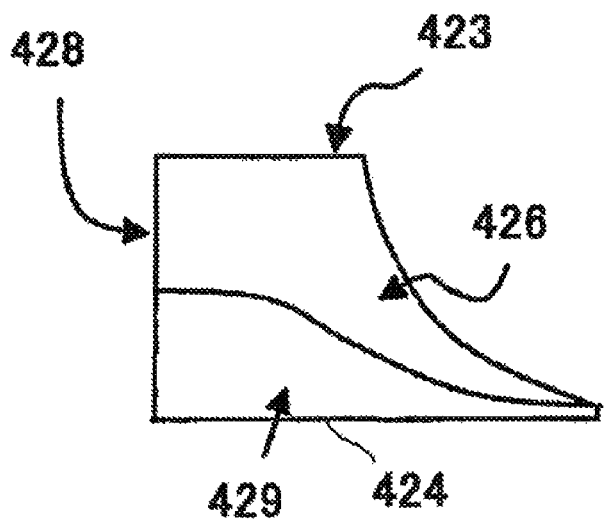
FIG. 25 is a right side view of the kneading element of a kneader shown in FIG. 21.

FIG. 25 is a right side view of the kneading element 402 (viewed from a G direction of FIG. 22).

As shown in FIGS. 23 and 25, an erection surface 428 is formed in a rotation direction back surface of the blade part 422.

Figure 24:
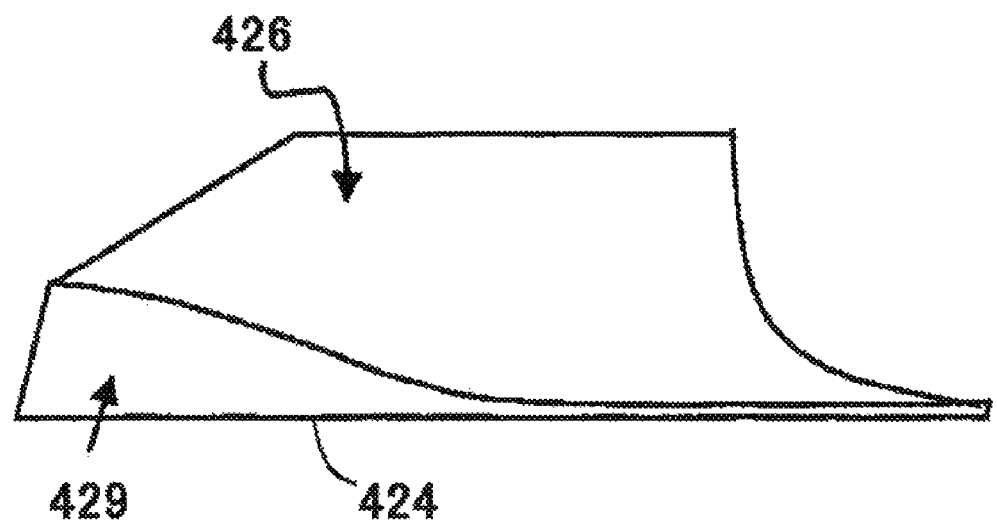
FIG. 24 is a back view of the kneading element of a kneader shown in FIG. 21.
Figure 26:
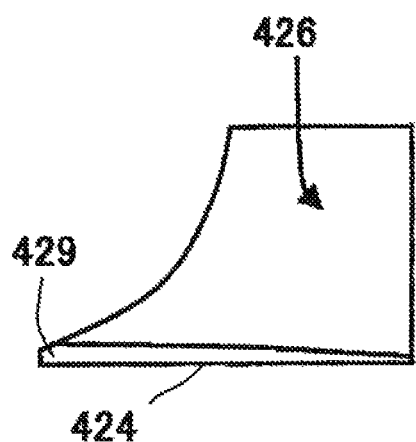
FIG. 26 is a left side view of the kneading element of a kneader shown in FIG. 21.

FIG. 24 is a back side view of the kneading element 402 (viewed from a J direction of FIG. 22). FIG. 26 is a left side view of the kneading element 402 (viewed from an I direction of FIG. 22).

As shown in FIGS. 24, 25 and 26, an erection surface 429 is provided between the bottom surface 424 and the inclined surface 426 of the blade part 422, and the height of the erection surface 429 gradually increases from the rotation direction front side toward the rotation direction rear side.

Next, the shape of the bottom surface of the blade part 422 is described.

Figure 21:
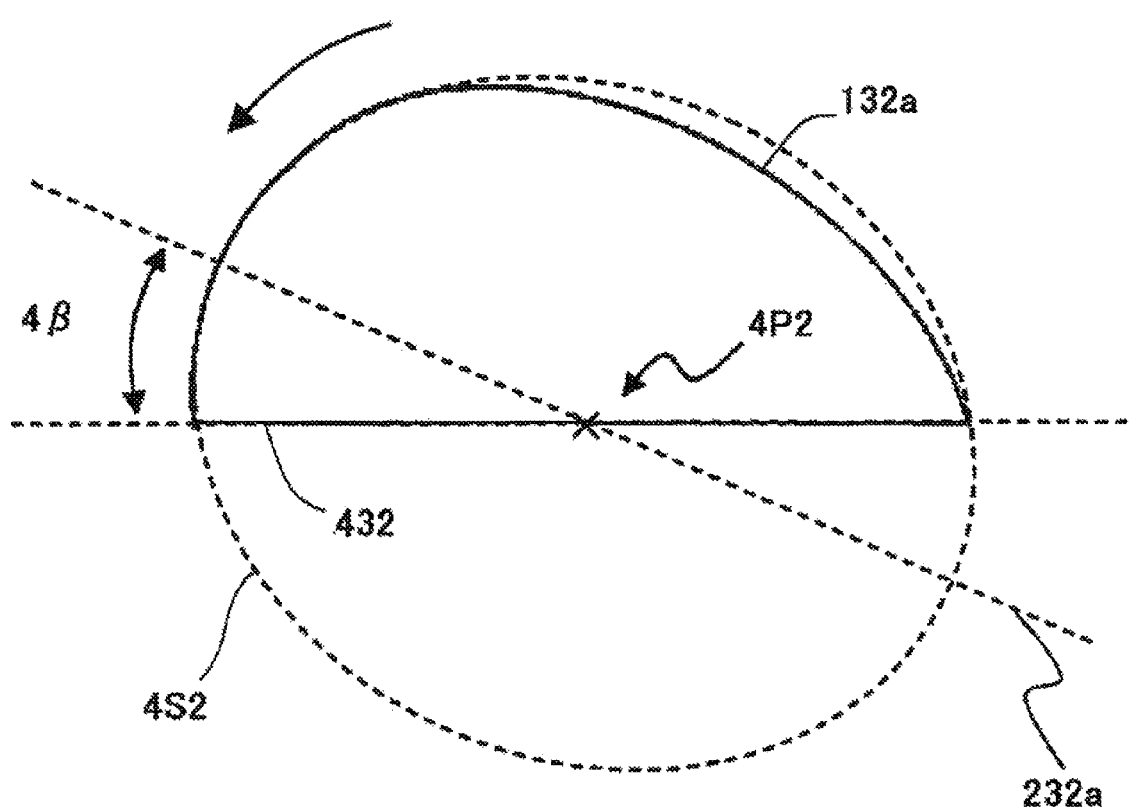
FIG. 21 is a schematic diagram for illustrating yet another embodiment of the kneading element of a kneader according to the present invention, showing the shape of a bottom surface circumferential edge of the kneading element of a kneader.

FIG. 21 is a diagram showing the shape of a bottom surface circumferential edge of the blade part 422. The arrow shown in the diagram represents the rotation direction of the kneading element 402.

The bottom surface circumferential edge of the blade part 422 shown by a solid line is in a substantially semi-elliptical shape surrounded by a bottom surface straight line part 432 and a bottom surface curved part 132a.

Note that the bottom surface straight line part 432 shown in FIG. 21 has a basic shape, but actually it may be changed appropriately as shown in, for example, FIGS. 27 and 29, depending on the type of the ingredients to be kneaded.

An ellipse 4S2 shown by a dashed line is an ellipse used for determining the shape of the bottom surface circumferential edge of the blade part 422. Reference numeral 4P2 represents the center of the ellipse 4S2, and reference numeral 232a a long axis of the ellipse 4S2. Reference numeral 4β represents an inclination of the bottom surface straight line part 432 in relation to the long axis 232a of the ellipse 4S2 (within a rotation surface).

Note that the aspect ratio of the ellipse 4S2 can be changed appropriately. A circle having an aspect ratio of 1:1 may be taken as a type of an ellipse.

The length from the shaft center O1 to the bottom surface circumferential edge of the kneading element 402 is set such that it gradually increases as the kneading element 402 rotates. Specifically, in FIG. 22, the size and the like of the ellipse 4S2 are set such that "l1>l3>l2" is established in the relationship between the length "l1" from the shaft center O1 to an outer edge 428a of the rotation direction rear end of the blade part 422, the length "l2" from the shaft center O1 to an outer edge 427a of the rotation direction front end of the blade part 422, and the length "l3" of a short direction of the blade part 422.

Even when the dough enters and adheres between the kneading element 402 and the bottom surface within the pot, setting the magnitude relationship between the lengths "l1" "l2" and "l3" can further enhance the effect of efficiently scraping out the dough by means of a bottom surface outer circumference of the rotating kneading element 402 that gradually increases the rotation width thereof, whereby the dough can be removed immediately.

Note that the length l1 is set slightly shorter than the radius of the bottom surface within the pot.

The shape of the side surface 426 of the blade part 422 is described next.

When the inclined surface 426 is sectioned along a plain surface "orthogonal to the bottom surface of the blade part" and "having the rotating shaft," the cross section of the inclined surface 426 of the blade part 422 at a partial area extending from the rotation direction front side of the blade part 422 to the rotation direction rear side of the same is shaped into a curve bending on the bottom surface 24 side of the blade part 422. The curvature of this curve decreases gradually from the rotation direction front side toward the rotation direction rear side.

In this manner, the cross section of the inclined surface 426 of the blade part 422 is shaped into a curve hollowed in the rotation direction front side, and the depth of this hollow gradually becomes narrow throughout the rotation direction rear side.

Note that although the cross section of the inclined surface 426 at the rotation direction rear end of the blade part is in the shape of a substantially straight line as shown in FIG. 23, this inclined surface may be formed into a curve bending on the opposite side of the bottom surface of the blade part (upper surface side of the kneading element).

By employing the cross section of the inclined surface described above, the ingredients and dough mass that are placed on the inclined surface 426, as a result of rotation of the kneading element 402, from the rotation direction front end 422a of the inclined surface 426 can be guided to the rotation direction rear side along the inclined surface 426. Particularly, due to the synergetic effect with the erection surface 429 that increases in height from the rotation direction front side toward the rotation direction rear side, the dough mass that is guided to the rotation direction rear side along the inclined surface 426 can be vigorously thrown toward the upper side of an inner wall (circumferential surface) of the pot. As a result, great pressure can be applied directly from the entire area of the inner wall of the pot to the dough mass.

Figure 30:
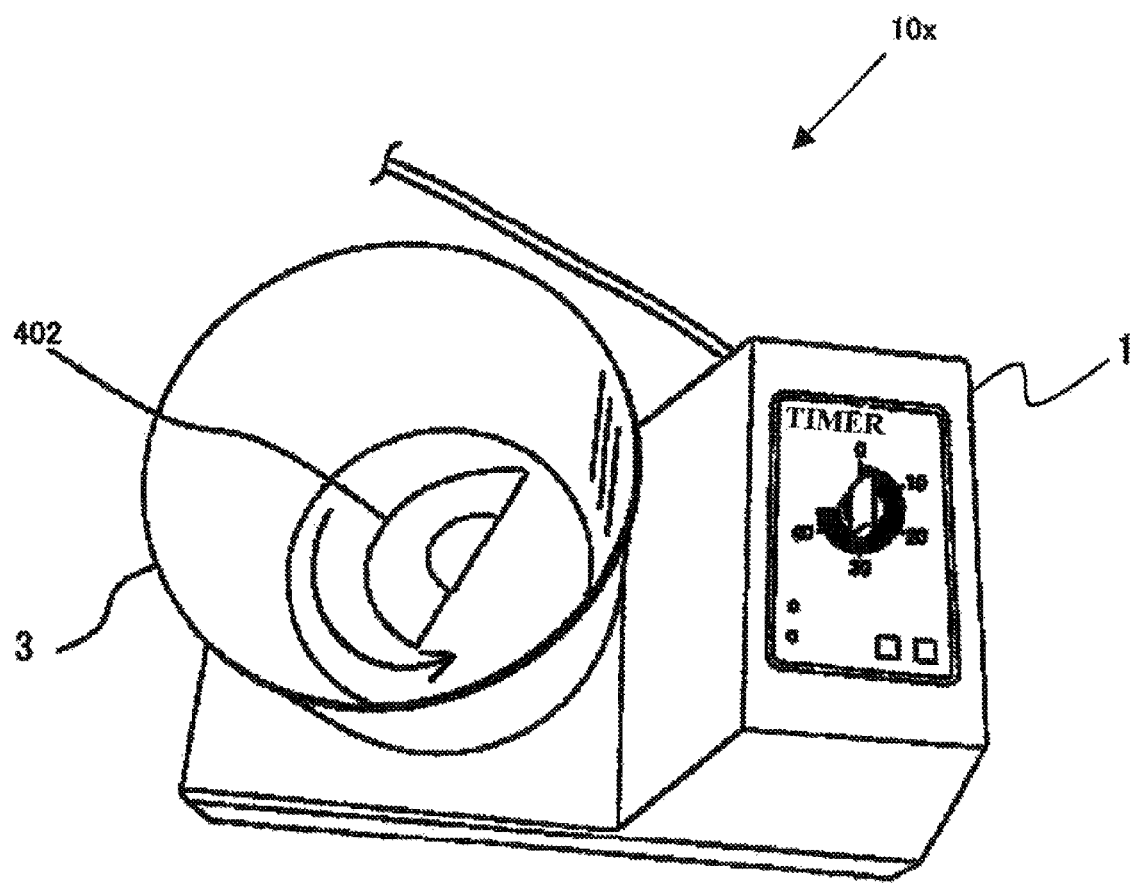
FIG. 30 is a perspective view showing another embodiment of the kneader according to the present invention.

Thus, a kneader 10x shown in FIG. 30, which is completed by disposing not the kneading element 2 of the kneader 10 shown in FIG. 14 but the kneading element 402 in the bottom part of the pot 3 can realize the same effect as that of the kneader 10, that is, "kneading" which is performed without cutting the dough mass or applying friction to the surface of the dough mass.

By using the abovementioned kneading element 402 in place of the kneading element 300 of the bread machines 100, 100b shown in FIGS. 15, 19, the same effect as that of the bread machines 100 and 100b can be achieved. In other words, sufficiently elastic and viscous gluten can be formed, whereby fluffy bread can be created.

Next, for yet another embodiment of the kneading element of a kneader according to the present invention, the sections that are different from the embodiments described above will mainly be described.

Unlike the kneading element of the above-described embodiments, the kneading element of a kneader according to this embodiment has a concave-convex surface formed in part of or the entire surface of the kneading element.

Figure 31:
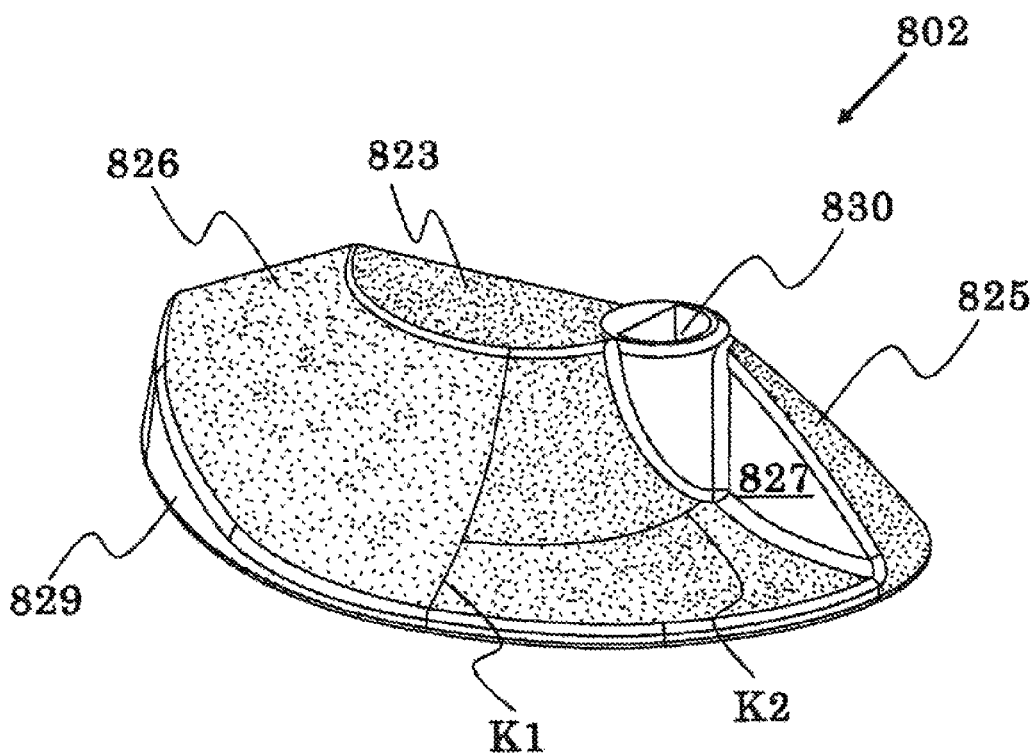
FIG. 31 is a perspective view showing yet another embodiment of a kneader according to the present invention.
Figure 32:
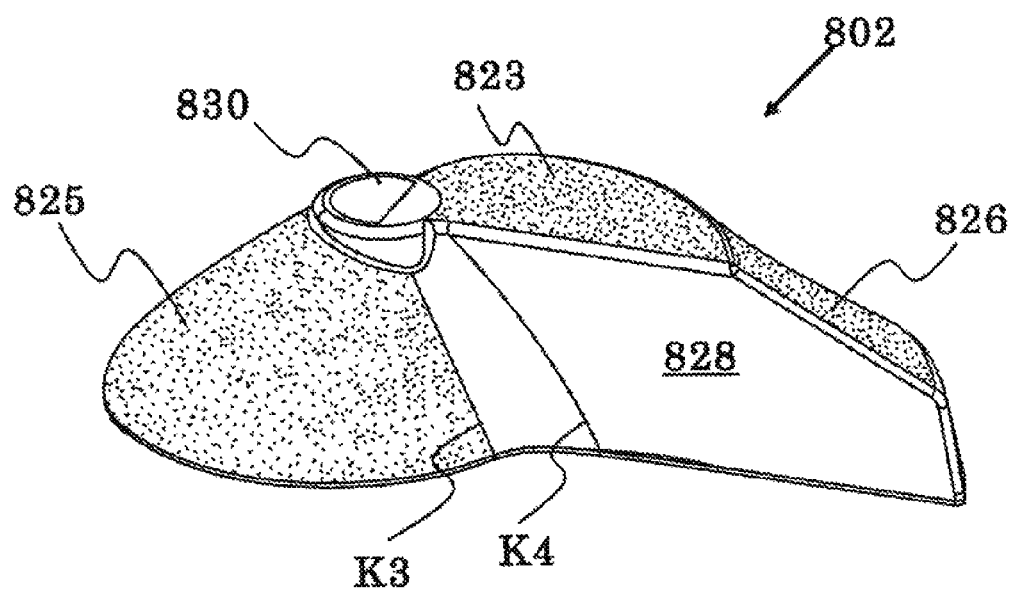
FIG. 32 is another perspective view of the kneading element of a kneader that is shown in FIG. 31.

FIGS. 31 and 32 are perspective views showing an embodiment of a kneader, wherein the dots represent projected parts forming the concave-convex surface. A kneader 802 has a top surface 823, an inclined surface 825, and an inclined surface 826 that are formed by the concave-convex surfaces.

Reference numerals 827, 828 represent erection surfaces.

Reference numeral 830 represents a shaft hole capable of being coupled to a rotary driving shaft of drive means for rotary driving the kneading element 802.

Note that reference numerals K1, K2, K3 and K4 are reference lines for expressing the three-dimensional shape of the inclined surfaces.

Figure 33:
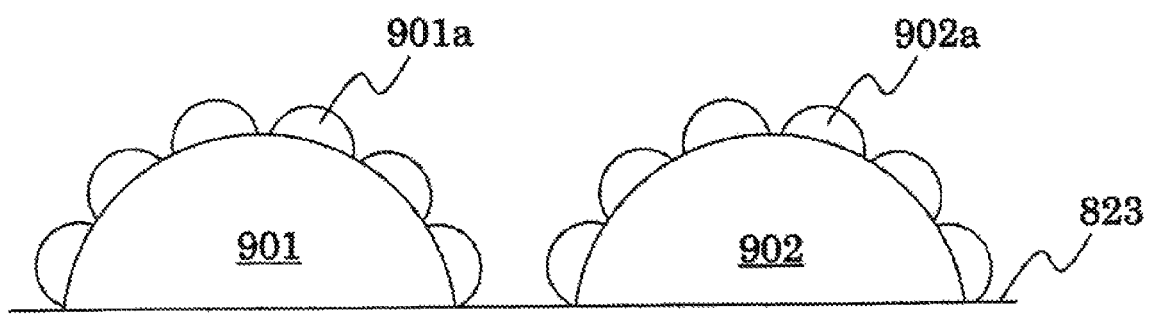
FIG. 33 is a cross-sectional diagram showing an example of a concave-convex surface provided on the surface of the kneading element of a kneader that is shown in FIGS. 31 and 32.

FIG. 33 is a schematic diagram showing an example of the concave-convex parts provided on the surface of the kneading element 802, and shows a cross-sectional diagram of the projected parts provided on the top surface 823, wherein a ground surface 823 of the top surface 823 is provided with projected parts 901, 902, and surfaces of the projected parts 901, 902 are provided with a plurality of projected parts 901a, 902a respectively.

By providing a large number of projected parts on the surface of the kneading element 802 as described above, the concave parts are provided around the projected parts, whereby the concave-convex surface is formed on the surface of the kneading element 802.

The height of the projected parts 901, 902 or the projected parts 901a, 902a may be determined appropriately in accordance with the characteristics of a kneaded product. For example, the height of the projected parts 901, 902 is set at 150 to 300 μmm, and the height of 402, the projected parts 901a, 902a is set at 30 to 140 μmm.

By forming such a fine concave-convex surface on the surface of the kneading element 802, a large number of small spaces can be formed on the ground surface of the kneading element 802. While the kneading element 802 performs kneading, air enters and remains in these small spaces. As a result, the air remaining in these small spaces prevents the kneaded product obtained by the kneading element 802 from adhering to the ground surface of the kneading element 802.

The projected parts provided on the surface of the inclined surface can promote the rotation of the dough mass on the inclined surface, the dough mass being guided to the rotation direction rear side of the kneading element along the inclined surface and kneaded, whereby the kneading efficiency can be improved.

According to the embodiments described above, since the surface of the kneading element is formed of the concave-convex surface, the dough mass is guided along the surface of the kneading element from the rotation direction front side of the kneading element toward the rotation direction rear side of the same, without adhering to the ground surface of the kneading element. As a result, the dough mass can be vigorously thrown toward the upper section of the inner wall of the pot of the kneader, whereby the abovementioned kneading effect can be improved.

Note that the embodiment above has described an example in which the first projected parts 901, 902 are provided on the surface of the kneading element 802 and the second projected parts 901a, 902a are provided on the surfaces of the first projected parts 901, 902. Instead, for example, only the first projected parts 901, 902 may be provided on the surface of the kneading element.

In the examples shown in FIGS. 31, 32, although the concave-convex surface is formed on the inclined surface 825, inclined surface 826 and top surface 802 of the kneader 802, but the concave-convex surface may be formed, for example, only on the inclined surface 826. Further, for example, the concave-convex surface may be formed not on the entire surface but partially on the inclined surface 826.

In addition, each of the kneading elements shown in FIGS. 31, 32 is configured such that the two blade parts having a substantially semi-elliptical bottom surface circumferential edge are bonded together as shown in FIG. 1. However, the concave-convex surface may be formed on the surface of the kneading element that has one blade part having a substantially semi-elliptical bottom surface circumferential edge as shown in FIG. 22.

INDUSTRIAL APPLICABILITY

The present invention can be applied for mixing and kneading and then pounding a dough material into a cake, such as a bread dough, a noodle dough such as wheat vermicelli and buckwheat vermicelli, a confectionary dough, or a rice cake.

The invention claimed is:

1. A kneading element of a kneader, which is rotary driven around a rotating shaft disposed in a bottom part in a pot, to knead ingredients within the pot, the kneading element comprising:
a blade part having a bottom surface circumferential edge that is substantially semi-elliptical, wherein
an inclined surface is formed in a side surface of the blade part,
an erection surface is formed in a rotation direction back surface of the blade part, and
the kneading element rotates the ingredients to he kneaded on the inclined surface in a direction opposite to the rotation direction of the kneading element.

2. The kneading element of a kneader according to claim 1, wherein when the kneading element is sectioned along a plane surface that is orthogonal to the bottom surface of the blade part and includes the rotating shaft, a cross section of the inclined surface in a partial area from a rotation direction front side of the blade part to a rotation direction rear side of the blade part is in the shape of a curve bending on the bottom surface side of the blade part, and a curvature of the curve gradually decreases from the rotation direction front side to the rotation direction rear side.

3. The kneading element of a kneader according to claim 2, wherein the cross section of the inclined surface at a rotation direction rear end of the blade part is in the shape of a straight line or a curve bending on a side opposite to the bottom surface of the blade part.

4. The kneading element of a kneader according to claim 1, wherein projected parts are provided on a surface of the inclined surface.

5. A kneading element of a kneader, which is rotary driven around a rotating shaft disposed in a bottom part in a pot, to knead ingredients within the pot, the kneading element comprising:
a first blade part and a second blade part, wherein
the first blade part and the second part are formed like being bonded with each other,
the first blade part and the second blade part have bottom surface circumferential edges that are substantially semi-elliptical respectively,
the length of a bottom surface straight line part of the first blade part is shorter than the length of a bottom surface straight line part of the second blade part, the first blade part and the second blade part are in contact with each other such that the bottom surface straight line parts of the first blade part and the second blade part hold, therebetween, a shaft center of the rotating shaft and a straight line passing through the shaft line, and such that a rotation direction rear end of a bottom surface curve part of the first blade part and a rotation direction front end of a bottom surface curve part of the second blade part are connected together in abutment to form a circular arc, a first inclined surface is formed in a side surface of the first blade part, a second inclined surface is formed in a side surface of the second blade part, an erection surface connected to a rotation direction front end of the first inclined surface is formed in a rotation direction back surface of the second blade part, and the kneading element rotates the ingredients to be kneaded on the second inclined surface in a direction opposite to the rotation direction of the kneading element.

6. The kneading element of a kneader according to claim 5, wherein when the kneading element is sectioned along a plane surface that is orthogonal to a bottom surface of the second blade part and includes the rotating shaft, a cross section of the second inclined surface in a partial area from a rotation direction front side of the second blade part to a rotation direction rear side of the second blade part is in the shape of a curve bending on the bottom surface side of the second blade part, and a curvature of the curve gradually decreases from the rotation direction front side to the rotation direction rear side.

7. The kneading element of a kneader according to claim 6, wherein the cross section of the second inclined surface at a rotation direction rear end of the second blade part is in the shape of a straight line or a curve bending on a side opposite to the bottom surface of the second blade part.

8. The kneading element of a kneader according to claim 5, wherein projected parts are provided on a surface of the second inclined surface.

9. The kneading element of a kneader according to claim 5, wherein when the kneading element is sectioned along a plane surface that is orthogonal to a bottom surface of the first blade part and includes the rotating shaft, a cross section of the first inclined surface in a partial area from a rotation direction front side of the first blade part to a rotation direction rear side of the same is in the shape of a curve bending on the bottom surface side of the first blade part, and a curvature of the curve gradually decreases from the rotation direction front side to the rotation direction rear side.

10. The kneading element of a kneader according to claim 9, wherein the cross section of the first inclined surface at the rotation direction rear end of the first blade part is in the shape of a straight line or a curve bending on a side opposite to the bottom surface of the first blade part.

11. The kneading element of a kneader according to claim 5, wherein a projected part is provided on a surface of the first inclined surface.

12. A kneader, comprising:

a pot;

a kneading element for kneading ingredients within the pot; and drive means for rotary driving the kneading element in a bottom part within the pot, wherein the kneading element comprising:

a blade part having a bottom surface circumferential edge that is substantially semi-elliptical, wherein an inclined surface is formed in a side surface of the blade part, an erection surface is formed in a rotation direction back surface of the blade part, and the kneading element rotates the ingredients to be kneaded on the inclined surface in a direction opposite to the rotation direction of the kneading element.

13. A bread machine that can be installed with a kneading pot used for kneading ingredients for bread, and a baking pot used for baking kneaded dough mass of bread, wherein a kneading element attached in the kneading pot and kneading the ingredients for bread the kneading element comprising:

a blade part having a bottom surface circumferential edge that is substantially semi-elliptical, wherein an inclined surface is formed in a side surface of the blade part, an erection surface is formed in a rotation direction back surface of the blade part, and the kneading element rotates the ingredients to be kneaded on the inclined surface in a direction opposite to the rotation direction of the kneading element.

14. The bread machine according to claim 13, wherein the kneading pot and the baking pot are interchangeable.

15. The bread machine according to claim 13, wherein the kneading pot and the baking pot can be provided side-by-side.

* * * * *